United States Patent
Hsiao et al.

(10) Patent No.: US 12,539,278 B2
(45) Date of Patent: Feb. 3, 2026

(54) NANOCOMPOSITE PARTICLE AND USES THEREOF

(71) Applicants: Academia Sinica, Taipei (TW); National Yang Ming Chiao Tung University, Hsinchu (TW)

(72) Inventors: Michael Hsiao, Taipei (TW); Ming-Hsien Chan, Taipei (TW); Nelson G. Chen, Hsinchu (TW); Ru-Shi Liu, Taipei (TW)

(73) Assignees: Academia Sinica, Taipei (TW); National Yang Ming Chiao Tung University, Hsinchu (TW)

( * ) Notice: Subject to any disclaimer, the term of this patent is extended or adjusted under 35 U.S.C. 154(b) by 1010 days.

(21) Appl. No.: 17/628,559

(22) PCT Filed: Sep. 1, 2020

(86) PCT No.: PCT/US2020/048854
§ 371 (c)(1),
(2) Date: Jan. 19, 2022

(87) PCT Pub. No.: WO2021/042082
PCT Pub. Date: Mar. 4, 2021

(65) Prior Publication Data
US 2022/0257524 A1    Aug. 18, 2022

Related U.S. Application Data

(60) Provisional application No. 62/894,851, filed on Sep. 1, 2019.

(51) Int. Cl.
*A61K 9/51* (2006.01)
*A61K 41/00* (2020.01)
(Continued)

(52) U.S. Cl.
CPC .......... *A61K 9/5115* (2013.01); *A61K 9/5123* (2013.01); *A61K 9/5146* (2013.01);
(Continued)

(58) Field of Classification Search
None
See application file for complete search history.

(56) References Cited

U.S. PATENT DOCUMENTS

2022/0220370 A1\* 7/2022 Hsiao .................. C09K 11/883

FOREIGN PATENT DOCUMENTS

WO    WO-2019217721 A1 \* 11/2019 ......... C09K 11/7773

OTHER PUBLICATIONS

Hailong Qiu, Meiling Tan, Tymish Y. Ohulchanskyy, Jonathan F. Lovell and Guanying Chen. "Recent Progress in Upconversion Photodynamic Therapy." Nanomaterials, vol. 8, 2018, pp. 1-18. (Year: 2018).\*

(Continued)

*Primary Examiner* — Isaac Shomer
(74) *Attorney, Agent, or Firm* — NZ Carr Law Office

(57) ABSTRACT

Disclosed herein is a nanocomposite particle comprising a core-shell-shell nanoparticle, an encapsulated nanorod linked with the core-shell-shell nanoparticle, and a lipid layer encapsulating the core-shell-shell nanoparticle and the encapsulated nanorod. The core-shell nanoparticle comprises a phosphor core, an inner shell layer, an outer shell layer, and a cationic polymer. The encapsulated nanorod comprises a nanorod, and a mesoporous scaffold. According to embodiments of the present disclosure, the encapsulated nanorod is linked with the core-shell-shell nanoparticle via an electrostatic interaction between the cationic polymer and the mesoporous scaffold. Also disclosed are the uses of the nanocomposite in treating diseases, for example, cancers.

19 Claims, 12 Drawing Sheets

(51) Int. Cl.
   *A61P 35/00*     (2006.01)
   *B82Y 5/00*      (2011.01)
   *B82Y 15/00*     (2011.01)
   *C09K 11/02*     (2006.01)
   *C09K 11/77*     (2006.01)
   *B82Y 40/00*     (2011.01)
(52) U.S. Cl.
   CPC .......... *A61K 41/0057* (2013.01); *A61P 35/00* (2018.01); *C09K 11/025* (2013.01); *C09K 11/7705* (2013.01); *C09K 11/7773* (2013.01); *B82Y 5/00* (2013.01); *B82Y 15/00* (2013.01); *B82Y 40/00* (2013.01)

(56)          References Cited

OTHER PUBLICATIONS

Chieh-Wei Chen, Yung-Chieh Chan, Michael Hsiao, and Ru-Shi Liu. "Plasmon-Enhanced Photodynamic Cancer Therapy by Upconversion Nanoparticles Conjugated with Au Nanorods." Applied Materials & Interfaces, vol. 8, 2016, pp. 32108-32119 and S-1 through S-12. (Year: 2016).*

* cited by examiner 100 nm

NANOCOMPOSITE PARTICLE AND USES THEREOF

CROSS-REFERENCES TO RELATED APPLICATIONS

This application is a U.S. National Stage Filing under 35 U.S.C. 371 from International Patent Application Serial No. PCT/US20/48854, filed Sep. 1, 2020, and published on Mar. 4, 2021, which claims the priority of U.S. Ser. No. 62/894,851, filed Sep. 1, 2019, the disclosure of which are incorporated by reference herein in their entireties.

BACKGROUND OF THE INVENTION

1. Field of the Invention

The present disclosure in general relates to the field of disease treatment. More particularly, the present disclosure relates to a novel nanocomposite particle and uses thereof in the treatment of diseases, for example, cancers.

2. Description of Related Art

Cancer is a group of diseases caused by abnormal cell growth. According to the report of World Health Organization (WHO), cancer is the second leading cause of death globally that is responsible for an estimated 9.6 million deaths in 2018. Common cancers include lung cancer, colorectal cancer, stomach cancer (also known as gastric cancer), liver cancer, and breast cancer, which collectively lead to 4.8 million deaths in 2018.

The mainstream treatments for cancers include surgery (i.e., removing the cancer from the patient's body), radiation therapy (i.e., administering to the patient high doses of radiation thereby destroying cancer cells), chemotherapy (i.e., suppressing the cancer growth by use of drugs), immunotherapy (i.e., eliciting the immune response of the patient against cancer cells), and hormone therapy (i.e., slowing or suppressing the cancer growth by use of hormones). However, none of these treatments are completely satisfactory due to various limitations. For example, surgical therapy is useful in removing obvious cancerous tissues, but its effectiveness is limited by metastatic cancer cells and/or cancers that are too small to be observed or measured. Further, surgery may result in some complications, such as infection, blood clots, and pneumonia. Radiation therapy and chemotherapy are known to nonspecifically damage normal tissues, especially the tissues surrounding the cancerous tissues, and thereby causing unpleasant side-effects, e.g., fatigue, hair loss, infection, bleeding, nausea, vomiting, diarrhea, loss of appetite, skin rash, and/or insomnia. The disadvantages of immunotherapy include high cost and severe side effects (e.g., cytokine storm, inflammation, and allergy). In addition, it is reported that immunotherapy may elicit immune tolerance in the long run that exacerbates the cancer progression. Regarding hormone therapy, it merely provides an inhibitory effect on hormone-related cancers, for example, breast cancer and prostate cancer. Further, cancer cells usually develop resistance to hormone therapy over time.

In view of the foregoing, there exists in the related art a need for a novel method for effectively treating cancers.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the disclosure is directed to a nanocomposite particle, which comprises a core-shell-shell nanoparticle, an encapsulated nanorod linked with the core-shell-shell nanoparticle, and a lipid layer for encapsulating the core-shell-shell nanoparticle and the encapsulated nanorod. According to embodiments of the present disclosure, the core-shell nanoparticle comprises a phosphor core, an inner shell layer encapsulating the phosphor core, an outer shell layer encapsulating the inner shell layer, and a cationic polymer coupled to the outer shell layer; and the encapsulated nanorod comprises a nanorod, and a mesoporous scaffold encapsulating the nanorod. The encapsulated nanorod is linked with the core-shell-shell nanoparticle via an electrostatic interaction between the cationic polymer and the mesoporous scaffold.

According to embodiments of the present disclosure, the phosphor core is made of a first phosphor material doped with an emitter ion, the inner shell layer is made of a second phosphor material doped with an absorber ion, and the outer shell layer is made of a third phosphor material. In general, the first, second and third phosphor materials are independently selected from the group consisting of sodium yttrium fluoride, lanthanum fluoride, lanthanum oxysulfide, yttrium oxysulfide, yttrium fluoride, yttrium gallate, yttrium aluminum garnet, gadolinium fluoride, barium yttrium fluoride, and gadolinium oxysulfide. The emitter ion and absorber ion are independently selected from the group consisting of, erbium (Er), ytterbium (Yb), thulium (Tm), holmium (Ho), neodymium (Nd), and praseodymium (Pr). According to certain embodiments of the present disclosure, each of the first, second and third phosphor materials is sodium yttrium fluoride. In some working examples, the first phosphor material is doped with Yb, Er and Ho, and the second phosphor material is doped with Yb and Nd.

The cationic polymer may vary with desired purposes. Examples of cationic polymer suitable to be coupled with the outer shell layer of the present nanocomposite particle include, but are not limited to, protamine, histone, spermine, spermidine polylysine, polyhistidine, polyarginine, polyornithine, polybrene, and a combination thereof.

The nanorod may be a gold nanorod, a silver nanorod, a platinum nanorod, a copper nanorod, a palladium nanorod, or a zinc oxide (ZnO) nanorod. According to certain embodiments of the present disclosure, the nanorod is a gold nanorod. In these embodiments, the mesoporous scaffold is a mesoporous silica scaffold.

Optionally, the nanocomposite particle of the present disclosure further comprises a therapeutic agent in the mesoporous scaffold. The therapeutic agent may be an anti-tumor agent, an anti-inflammatory agent, an anti-microbial agent, an anti-oxidant agent, a growth factor, or a photosensitizing agent.

Another aspect of the present disclosure pertains to the use of the present nanocomposite in treating a tumor in a subject. The method comprises, (a) administering to the subject an effective amount of the nanocomposite particle of present disclosure, in which the nanocomposite particle comprises an anti-tumor agent or a photosensitizing agent in the mesoporous scaffold; and (b) irradiating the subject of step (a) with a light having a wavelength of about 750-850 nm so as to produce a cytotoxic effect on the tumor.

According to certain embodiments of the present disclosure, each of the first, second and third phosphor materials of the nanocomposite particle is sodium yttrium fluoride. In some working examples, the first phosphor material of the nanocomposite particle is made of sodium yttrium fluoride doped with Yb, Er and Ho; and the second phosphor material of the nanocomposite particle is made of sodium yttrium fluoride doped with Yb and Nd. Preferably, the cationic polymer of the nanocomposite particle is protamine; the nanorod of the nanocomposite particle is a gold nanorod; and the mesoporous scaffold is a mesoporous silica scaffold.

According to some preferred examples, the light has a wavelength of about 808 nm.

Non-limiting examples of tumor treatable with the present method include, melanoma, leukemia, tongue carcinoma, colorectal carcinoma, esophageal carcinoma, gastric carcinoma, lung cancer, multiple myeloma, bladder cancer, breast cancer, pancreatic cancer, renal cancer, hepatocellular carcinoma, ovarian cancer, prostate cancer, and head and neck squamous cell carcinoma.

The subject is a mammal; preferably, a human.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where:

FIGS. 4A-4D depict the data according to Example 2.3 of the present disclosure, in which FIG. 4A is the image of transmission electron microscope (TEM) that illustrates the morphology of AuNR@UCNP; FIG. 4B is the photoluminescence (PL) spectrum of UCNP that illustrates the absorbance spectrum of AuNR; FIGS. 4C and 4D are line charts respectively illustrating the photoluminescence intensity of the protamine-coated UCNP (FIG. 4C), and the AuNR@mS-conjugated UCNP (FIG. 4D) in different concentrations.

FIGS. 5C and 5D respectively illustrate the ultrasound imaging of water and AuNR@UCNP@NB; FIGS. 5E and 5F respectively illustrate the DLS analytic result of AuNR@UCNP@NB (FIG. 5E), and the stability of AuNR@UCNP and AuNR@UCNP@NB during three weeks of storage in PBS or medium solution (FIG. 5F).

FIG. 7C depicts the images of laser scanning confocal microscopy (LSCM) of AuNR@UCNP@NB and UCNP with AuNR@NB.

Figure 1:
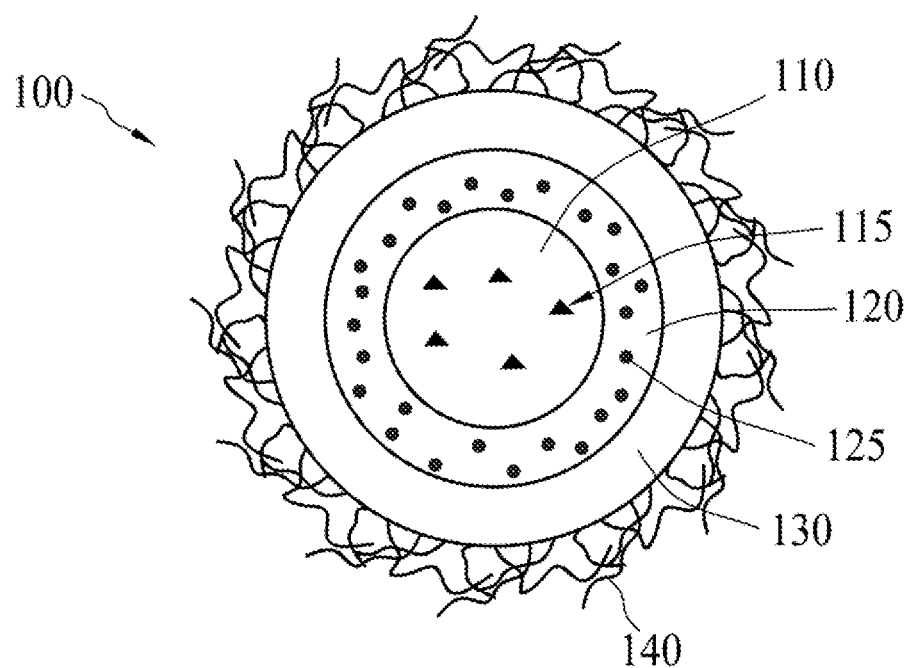
FIG. 1 is a schematic diagram depicting the core-shell-shell nanoparticle 100 of the nanocomposite particle according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

The term "phosphor" is used broadly to describe any photoluminescent material that absorbs light at one wavelength and emits light at another wavelength, regardless of the delay between absorption and emission. More specifically, the term "phosphor" as used herein refers to any photoluminescent material that absorbs light of a certain wavelength to excite electrons, and emits light in the fluorescence or phosphorescence spectrum when the electrons thus excited fall back to the ground state.

The term "nanoparticle" as used herein refers to any particle that is shaped as a polygon (for example, octahedral shape) or sphere, and is on the order of 10-9 meter, or one billionth of a meter. Specifically, the term "nanoparticle" refers to any particle having a diameter of less than 1,000 nanometer (nm). In various embodiments, the nanoparticle has a characteristic size (e.g., diameter or edge side) less than about 1,000 nm, 800 nm, or 500 nm; preferably less than about 400 nm, 300 nm, or 200 nm; more preferably about 100 nm or less, about 50 nm or less, or about 30 nm or 20 nm or less. Each nanoparticle can consist of a core, a core and a shell (as in core-shell nanoparticles), or a core and multiple shells (as in core-multi-shell particles).

As used herein, the term "nanorod" refers to a rod-like nanostructure having a narrow dimension (diameter) and a long dimension (length), where the ratio of the long dimension to the narrow dimension (the aspect ratio) is at least 3. In general, the aspect ratio is between 3 and 2000. By definition, the narrow dimension of the nanorod is a diameter between 1 and 200 nm. Accordingly, the length of the nanorod is between 0.003 and 400 µm.

As used herein, the term "mesoporous" is an art-recognized porous material comprising pores with a diameter ranging from about 2 to about 50 nm. The term "scaffold" refers to a material suitable for providing a scaffolding effect. The term "mesoporous scaffold" refers to a material comprising a plurality of mesopores, in which each mesopore may serve as a scaffold for specific molecules (e.g., therapeutic agents) to deposit thereon.

The term "dope" or "doped" refers to a very small amount (e.g., trace amount) of an ion (e.g., Er, Yb, Tm, Ho, Nd, or Pr) added to modify the electronic or physical properties of a substance (e.g., the phosphor material of the present disclosure) or to give it new properties.

The term "encapsulate" refers to the process of encompassing, encasing, or otherwise associating two or more materials such that the encapsulated material is immobilized within or onto the encapsulating material.

Here, the terms "couple," "link," and "conjugate" are interchangeably used, and refers to any means of connecting two components either via direct linkage or via indirect linkage between two components.

The term "subject" refers to a mammal including the human species that is treatable with the nanocomposite particle and/or method of the present invention. The term "subject" is intended to refer to both the male and female gender unless one gender is specifically indicated.

II. Description of the Invention

The first aspect of the present disclosure is directed to a nanocomposite particle, which comprises a core-shell-shell nanoparticle, at least one encapsulated nanorod linked with the core-shell-shell nanoparticle, and a lipid layer encapsulating the core-shell-shell nanoparticle and at least one encapsulated nanorod. Exemplary structures of the core-shell-shell nanoparticle, and the encapsulated nanorod are schematically illustrated in FIGS. 1 and 2, respectively. As depicted in FIG. 1, the core-shell-shell nanoparticle 100 comprises a phosphor core 110, an inner shell layer 120, an outer shell layer 130, and a cationic polymer 140. Structurally speaking, the phosphor core 110 is encapsulated by the inner shell layer 120, the inner shell layer 120 is encapsulated by the outer shell layer 130, and the cationic polymer 140 is coupled to the outer surface of the outer shell layer 130.

The phosphor core 110, the inner shell layer 120, and the outer shell layer 130 may be independently formed by any phosphor material that absorbs and emits light at different wavelengths; exemplary phosphor materials suitable for forming the phosphor core 110, the inner shell layer 120, and the outer shell layer 130 include, but are not limited to, sodium yttrium fluoride, lanthanum fluoride, lanthanum oxysulfide, yttrium oxysulfide, yttrium fluoride, yttrium gallate, yttrium aluminum garnet, gadolinium fluoride, barium yttrium fluoride, and gadolinium oxysulfide.

As exemplified in FIG. 1, the phosphor core 110 and the inner shell layer 120 are respectively doped with a first plurality of ions 115 and a second plurality of ions 125, in which the first and second plurality of ions 115, 125 respectively serve as an energy acceptor and an energy donor during the energy transfer (ET) process. Examples of doping ions commonly used in the production of nanoparticle include, but are not limited to, Er, Yb, Tm, Ho, Nd, and Pr. According to some embodiments of the present disclosure, the phosphor core 110 is made of sodium yttrium fluoride having Yb, Er and Ho doped therein, and the inner shell layer 120 is made of sodium yttrium fluoride having Yb and Nd doped therein. In these embodiments, the outer shell layer 130 is made of sodium yttrium fluoride, and the thus-produced core-shell-shell nanoparticle is termed "NaYF$_4$:Yb/Er/Ho@NaYF$_4$:Yb/Nd@NaYF$_4$" or "UCNP", in which the Nd, Yb, Er, and Ho ions respectively serve as the energy absorber, intermediator and emitter ions (i.e., an ET process of Nd$^{3+}$→Yb$^{3+}$→Er$^{3+}$→Ho$^{3+}$).

Depending on desired purposes, the outer surface of the outer shell layer 130 may be coupled with a cationic polymer 140, which is selected from the group consisting of protamine, histone, spermine, spermidine polylysine, polyhistidine, polyarginine, polyornithine, polybrene, and a combination thereof. According to certain embodiments of the present disclosure, the outer surface of the outer shell layer 130 is coupled with protamine. According to alternative embodiments, the outer surface of the outer shell layer 130 is coupled with polylysine.

Figure 2A:
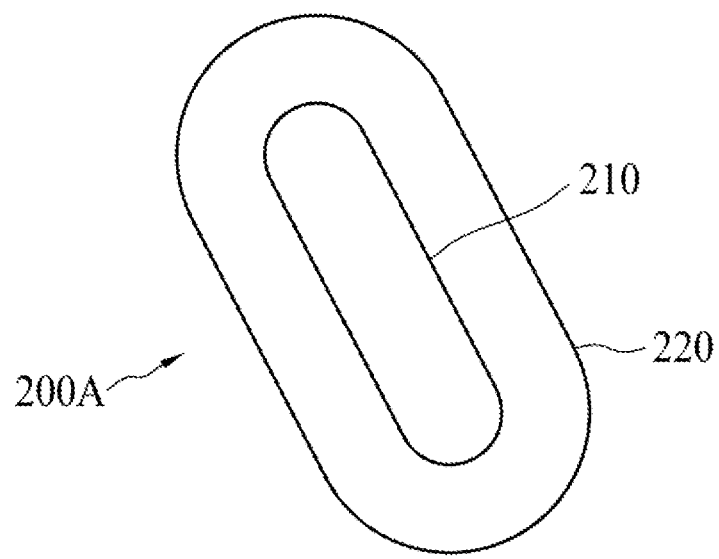
FIG. 2A is a schematic diagram depicting the encapsulated nanorod 200A of the nanocomposite particle according to one embodiment of the present disclosure.

Reference is made to FIG. 2A, which is an exemplary schematic structure of an encapsulated nanorod 200A. The encapsulated nanorod 200A comprises a nanorod 210, and a mesoporous scaffold 220 encapsulating the nanorod 210.

The nanorod 210 may be a gold nanorod, a silver nanorod, a platinum nanorod, a copper nanorod, a palladium nanorod, or a metal oxide nanorod (e.g., a zinc oxide (ZnO) nanorod). According to some working examples of the present disclosure, the nanorod 210 is a gold nanorod (i.e., AuNR).

The mesoporous scaffold 220 may be formed by any material that comprises mesopores, in which each mesopore serves as a scaffold for therapeutic agents. According to certain embodiments of the present disclosure, the mesoporous scaffold 220 is a mesoporous silica scaffold.

Figure 2B:
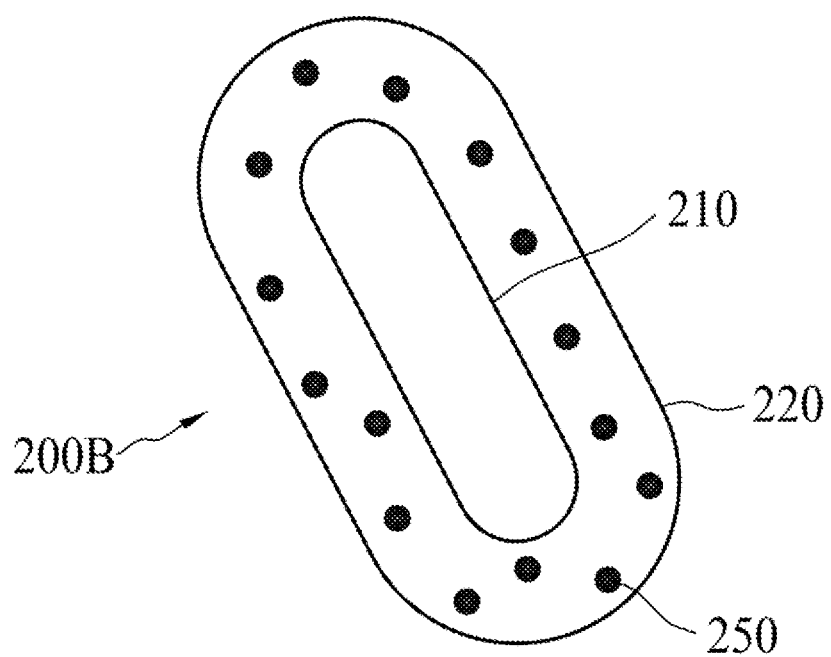
FIG. 2B is a schematic diagram depicting the encapsulated nanorod 200B of the nanocomposite particle that comprising an agent 250 in the mesoporous scaffold 220 according to another embodiment of the present disclosure.

FIG. 2B is a schematic drawing of an encapsulated nanorod 200B in accordance with an alternative embodiment of the present disclosure. The structure of the encapsulated nanorod 200B is quite similar to that of the encapsulated nanorod 200A of FIG. 2A, except the encapsulated nanorod 200B further comprises a therapeutic agent 250 dispersed in the mesoporous scaffold 220. The choice of therapeutic agent 250 may vary with intended uses. Examples of the therapeutic agent 250 suitable to be disposed in the encapsulated nanorod 200B include, but are not limited to, an anti-tumor agent, an anti-inflammatory agent, an anti-microbial agent, an anti-oxidant agent, a growth factor, a photosensitizing agent, and a combination thereof.

Examples of the anti-tumor agent include, but are not limited to, curcumin, interferons, cytokines (e.g., tumor necrosis factor, interferon α, interferon γ), antibodies (e.g. Herceptin (trastuzumab), T-DM1, AVASTIN (bevacizumab), ERBITUX (cetuximab), Vectibix (panitumumab), Rituxan (rituximab), and Bexxar (tositumomab)), anti-estrogens (e.g. tamoxifen, raloxifene, and megestrol), LHRH agonists (e.g. goserelin and leuprolide), anti-androgens (e.g. flutamide and bicalutamide), photodynamic therapies (e.g. vertoporfin (BPD-MA), phthalocyanine, photosensitizer Pc4, and demethoxy-hypocrellin A (2BA-2-DMHA)), nitrogen mustards (e.g. cyclophosphamide, ifosfamide, trofosfamide, chlorambucil, estramustine, and melphalan), nitrosoureas (e.g. carmustine (BCNU) and lomustine (CCNU)), alkylsulphonates (e.g. busulfan and treosulfan), triazenes (e.g. dacarbazine, temozolomide), platinum containing compounds (e.g. cisplatin, carboplatin, oxaliplatin), vinca alkaloids (e.g. vincristine, vinblastine, vindesine, and vinorelbine), taxoids (e.g. paclitaxel or a paclitaxel equivalent such as nanoparticle albumin-bound paclitaxel (Abraxane), docosahexaenoic acid bound-paclitaxel (DHA-paclitaxel, Taxoprexin), polyglutamate bound-paclitaxel (PG-paclitaxel, paclitaxel poliglumex, CT-2103, XYOTAX), the tumor-activated prodrug (TAP) ANG1005 (Angiopep-2 bound to three molecules of paclitaxel), paclitaxel-EC-1 (paclitaxel bound to the erbB2-recognizing peptide EC-1), and glucose-conjugated paclitaxel, e.g., 2'-paclitaxel methyl 2-glucopyranosyl succinate; docetaxel, taxol), epipodophyllins (e.g. etoposide, etoposide phosphate, teniposide, topotecan, 9-aminocamptothecin, camptoirinotecan, irinotecan, crisnatol, mytomycin C), anti-metabolites, DHFR inhibitors (e.g. methotrexate, dichloromethotrexate, trimetrexate, edatrexate), IMP dehydrogenase inhibitors (e.g. mycophenolic acid, tiazofurin, ribavirin, and EICAR), ribonucleotide reductase inhibitors (e.g. hydroxyurea and deferoxamine), uracil analogs (e.g. 5-fluorouracil (5-FU), floxuridine, doxifluridine, ratitrexed, tegafur-uracil, capecitabine), cytosine analogs (e.g. cytarabine (ara C), cytosine arabinoside, and fludarabine), purine analogs (e.g. mercaptopurine and Thioguanine), Vitamin A analogs, Vitamin D3 analogs (e.g. EB 1089, CB 1093, and KH 1060), vitamin K, isoprenylation inhibitors (e.g. lovastatin), dopaminergic neurotoxins (e.g. 1-methyl-4-phenylpyridinium ion), cell cycle inhibitors (e.g. staurosporine), actinomycin (e.g. actinomycin D, dactinomycin), bleomycin (e.g. bleomycin A2, bleomycin B2, peplomycin), anthracycline (e.g. daunorubicin, doxorubicin (DOX), pegylated liposomal doxorubicin, idarubicin, epirubicin, pirarubicin, zorubicin, mitoxantrone), MDR inhibitors (e.g. verapamil), Ca$^{2+}$ ATPase inhibitors (e.g. thapsigargin), imatinib, thalidomide, lenalidomide, tyrosine kinase inhibitors (e.g., axitinib (AG013736), bosutinib (SKI-606), cediranib (RECENTIN™, AZD2171), dasatinib (SPRYCEL®, BMS-354825), erlotinib (TARCEVA®), gefitinib (IRESSA®), imatinib (Gleevec®, CGP57148B, STI-571), lapatinib (TYKERB®, TYVERB®), lestaurtinib (CEP-701), neratinib (HKI-272), nilotinib (TASIGNA®), semaxanib (semaxinib, SU5416), sunitinib (SUTENT®, SU11248), toceranib (PALLADIA®), vandetanib (ZACTIMA®, ZD6474), vatalanib (PTK787, PTK/ZK), trastuzumab (HERCEPTIN®), bevacizumab (AVASTIN®), rituximab (RITUXAN®), cetuximab (ERBITUX®), panitumumab (VECTIBIX®), ranibizumab (Lucentis®), nilotinib (TASIGNA®), sorafenib (NEXAVAR®), everolimus (AFINITOR®), alemtuzumab (CAMPATH®), gemtuzumabozogamicin (MYLOTARG®), temsirolimus (TORISEL®), ENMD-2076, PCI-32765, AC220, dovitinib lactate (TKI258, CHIR-258), BIBW 2992 (TOVOK™), SGX523, PF-04217903, PF-02341066, PF-299804, BMS-777607, ABT-869, MP470, BIBF 1120 (VARGATEF®), AP24534, JNJ-26483327, MGCD265, DCC-2036, BMS-690154, CEP-11981, tivozanib (AV-951), OSI-930, MM-121, XL-184, XL-647, and/or XL228), proteasome inhibitors (e.g., bortezomib (Velcade)), mTOR inhibitors (e.g., rapamycin, temsirolimus (CCI-779), everolimus (RAD-001), ridaforolimus, AP23573 (Ariad), AZD8055 (AstraZeneca), BEZ235 (Novartis), BGT226 (Norvartis), XL765 (Sanofi Aventis), PF-4691502 (Pfizer), GDC0980 (Genetech), SF1126 (Semafoe) and OSI-027 (OSI)), oblimersen, gemcitabine, carminomycin, leucovorin, pemetrexed, cyclophosphamide, dacarbazine, procarbizine, prednisolone, dexamethasone, campathecin, plicamycin, asparaginase, aminopterin, methopterin, porfiromycin, melphalan, leurosidine, leurosine, chlorambucil, trabectedin, procarbazine, discodermolide, carminomycin, aminopterin, and hexamethyl melamine.

Non-limiting examples of the anti-inflammatory agent include, curcumin, non-steroidal anti-inflammatory drugs (NSAIDs) including, alclofenac, alclometasone dipropionate, algestone acetonide, alpha amylase, amcinafal, amcinafide, amfenac sodium, amiprilose hydrochloride, anakinra, anirolac, anitrazafen, apazone, balsalazide disodium, bendazac, benoxaprofen, benzydamine hydrochloride, bromelains, broperamole, budesonide, carprofen, ciclofoprofen, cintazone, cliprofen, clobetasol propionate, clobetasone butyrate, clopirac, cloticasone propionate, cormethasone acetate, cortodoxone, decanoate, deflazacort, delatestryl, depo-testosterone, desonide, desoximetasone, dexamethasone dipropionate, diclofenac potassium, diclofenac sodium, diflorasone diacetate, diflumidone sodium, diflunisal, difluprednate, diftalone, dimethyl sulfoxide, drocinonide, endrysone, enlimomab, enolicam sodium, epirizole, etodolac, etofenamate, felbinac, fenamole, fenbufen, fenclofenac, fenclorac, fendosal, fenpipalone, fentiazac, flazalone, fluazacort, flufenamic acid, flumizole, flunisolide acetate, flunixin, flunixin meglumine, fluocortin butyl, fluorometholone acetate, fluquazone, flurbiprofen, fluretofen, fluticasone propionate, furaprofen, furobufen, halcinonide, halobetasol propionate, halopredone acetate, ibufenac, ibuprofen, ibuprofen aluminum, ibuprofen piconol, ilonidap, indomethacin, indomethacin sodium, indoprofen, indoxole, intrazole, isoflupredone acetate, isoxepac, isoxicam, ketoprofen, lofemizole hydrochloride, lomoxicam, loteprednol etabonate, meclofenamate sodium, meclofenamic acid, meclorisonedibutyrate, mefenamic acid, mesalamine, meseclazone, mesterolone, methandrostenolone, methenolone, methenolone acetate, methylprednisolone suleptanate, momiflumate, nabumetone, nandrolone, naproxen, naproxen sodium, naproxol, nimazone, olsalazine sodium, orgotein, orpanoxin, oxandrolane, oxaprozin, oxyphenbutazone, oxymetholone, paranyline hydrochloride, pentosan polysulfate sodium, phenbutazone sodium glycerate, pirfenidone, piroxicam, piroxicam cinnamate, piroxicam olamine, pirprofen, prednazate, prifelone, prodolic acid, proquazone, proxazole, proxazole citrate, rimexolone, romazarit, salcolex, salnacedin, salsalate, sanguinarium chloride, seclazone, sermetacin, stanozolol, sudoxicam, sulindac, suprofen, talmetacin, talniflumate, talosalate, tebufelone, tenidap, tenidap sodium, tenoxicam, tesicam, tesimide, testosterone, testosterone blends, tetrydamine, tiopinac, tixocortol pivalate, tolmetin, tolmetin sodium, triclonide, triflumidate, zidometacin, and zomepirac sodium.

The anti-microbial agent may be an anti-bacterial agent, an anti-viral agent, an anti-fungal agent, or an anti-parasite agent.

Examples of the anti-oxidant agent include, but are not limited to, amine (e.g., N,N-diethylhydroxylamine, and amino-guanidine), arginine pilolate, ascorbic acid and its salts, ascorbyl ester of fatty acid, bioflavonoid, butylated hydroxy benzoic acid and its salt, dihydroxy fumaric acid and its salts, gallic acid and its alkyl esters (e.g., propyl gallate, and uric acid), glycine pidolate, 6-hydroxy-2,5,7,8-tetramethylchroman-2-carboxylic acid, lipoic acid, lysine, melanin, methionine, nordihydroguaiaretic acid, proline, silymarin, sorbic acid and its salts, sulfhydryl compounds (e.g., glutathione), superoxide dismutase, catalase, tea extract, grape skin/seed extract, rosemary extract, tocopherol acetate, tocopherol, tocopherol sorbate, and a combination thereof.

Examples of the growth factor include, but are not limited to, angiopoietin, macrophage colony-stimulating factor (M-CSF), granulocyte colony-stimulating factor (G-CSF), granulocyte macrophage colony-stimulating factor (GM-CSF), placental growth factor (PLGF), vascular endothelial growth factor (VEGF), fibroblast growth factor (FGF), epidermal growth factor (EGF), bone morphogenetic protein (BMP), endoglin, endothelin, leptin, follistatin, hepatocyte growth factor (HGF), insulin-like growth factor (IGF), keratinocyte growth factor (KGF), nerve growth factor (NGF), growth factor-α (TGF-α), transforming growth factor-β (TGF-β), cartilage growth factor (CGF), stem cell factor (SCF), brain-derived neurotrophic factor (BDNF), platelet-derived growth factor (PDGF), interleukin (IL) and ephrin.

Non-limiting examples of the photosensitizing agent include, porphyrin, phthalocyanine, chlorin, bacteriochlorin, psoralen, purpurin, merocyanine, and aminolevulinic acid and esters thereof.

According to some embodiments of the present disclosure, thetherapeutic agent 250 is an anti-tumor agent, or a photosensitizing agent. In one specific example, the therapeutic agent 250 is merocyanine 540 (MC540), which is a photosensitizing agent that generates reactive oxygen species (ROS) upon being irradiated with a suitable wavelength.

Figure 3:
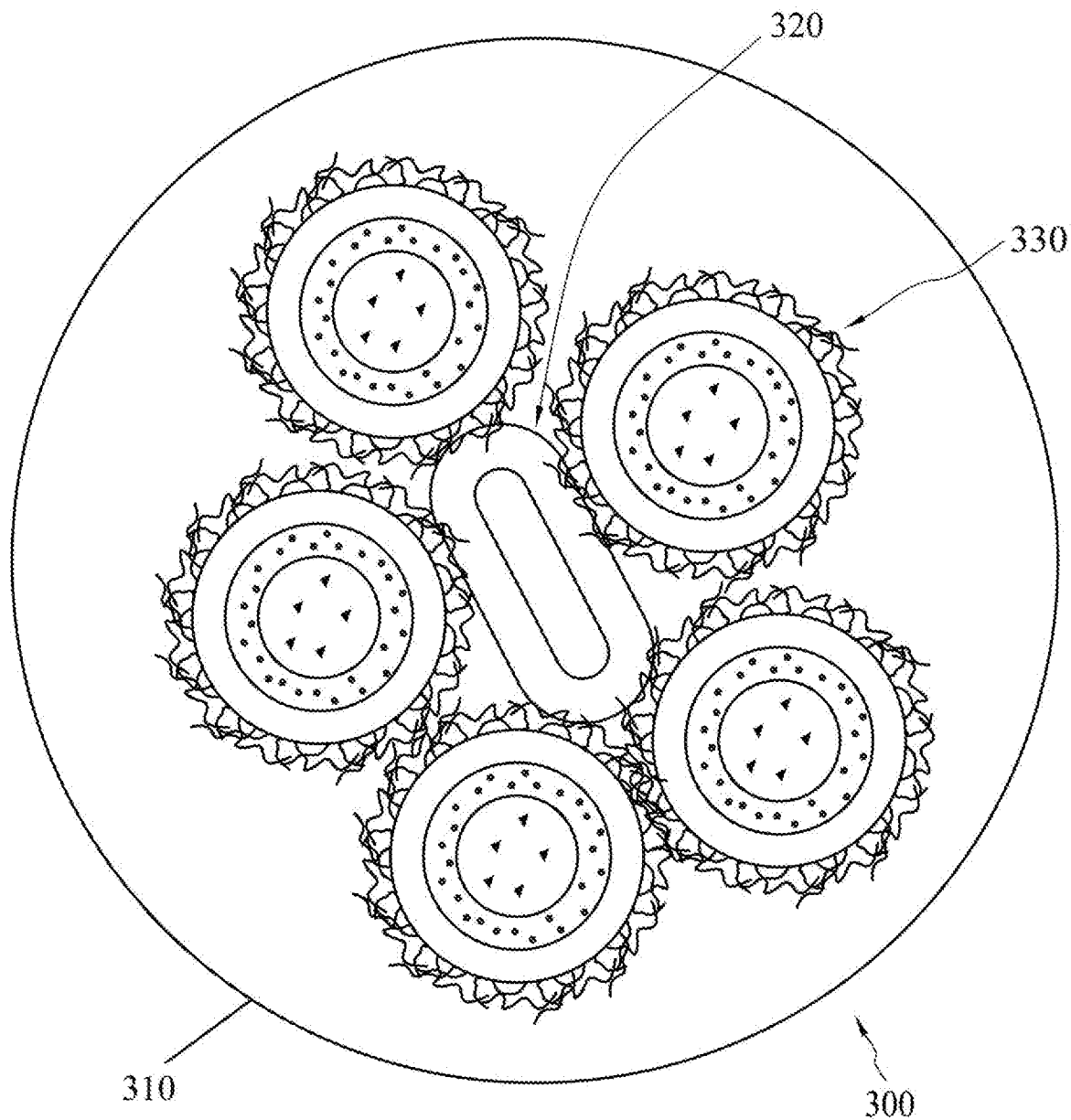
FIG. 3 is a schematic diagram depicting the nanocomposite particle 300 according to one embodiment of the present disclosure, wherein the nanocomposite particle 300 comprises one encapsulated nanorod 320, five core-shell-shell nanoparticles 330 coupled with the encapsulated nanorod 320, and a lipid layer 310 encapsulating the encapsulated nanorod 320 and the core-shell-shell nanoparticles 330.

Reference is now made to FIG. 3, which depicts the structure of a nanocomposite particle 300 of the present disclosure. The nanocomposite particle 300 is a nanovesicle per se, which is formed by a lipid layer 310 defining an internal void for containing an encapsulated nanorod 320 (such as the encapsulated nanorod 200A as depicted in FIG. 2A) and one or more (e.g., 1, 2, 3, 4, 5, 6, 7, 8, 9, 10, or more) core-shell-shell nanoparticles 330 linked to the encapsulated nanorod 320. Each of the core-shell-shell nanoparticles 330 may be the core-shell-shell nanoparticle 100 as depicted in FIG. 1, and has a cationic polymer coupled therewith to provide a positive electrostatic charge on the outer surface of the core-shell-shell nanoparticles 330. On the other hand, the encapsulated nanorod 320 may be that of FIG. 2A, in which the outer surface is formed by a mesoporous scaffold (e.g., the mesoporous silica scaffold) exhibiting a negative electrostatic charge. Accordingly, each core-shell-shell nanoparticle 330 may be coupled to the encapsulated nanorod 320 via an electrostatic interaction between the positive charge of the cationic polymer and the negative charge of the mesoporous scaffold.

As would be appreciated, the number of the core-shell-shell nanoparticles 330 coupled to the encapsulated nanorod 320, and the number of the encapsulated nanorod 320 and the core-shell-shell nanoparticles 330 in each nanocomposite particle 300 may vary with intended purposes. In general, the nanocomposite particle 300 comprises at least one (e.g., 1, 2, 3, 4, 5, 6, 7, 8, 9, 10, or more) encapsulated nanorod 320, wherein each encapsulated nanorod 320 is linked with at least one (e.g., 1, 2, 3, 4, 5, 6, 7, 8, 9, 10, or more) core-shell-shell nanoparticle 330. According to some embodiments of the present disclosure, the ratio between the encapsulated nanorod 320 and the core-shell-shell nanoparticle 330 is about 1:5 to 1:500 (w/w). In one specific example, the ratio between the encapsulated nanorod 320 and the core-shell-shell nanoparticle 330 is about 1:50 (w/w).

For the purpose of improving the therapeutic effect (e.g., inhibitory effect or cytotoxic effect) on desired tissues or cells, the encapsulated nanorod 320 may further comprise a therapeutic agent (e.g. an anti-tumor agent, or a photosensitizing agent) dispersed in the mesoporous scaffold (such as the encapsulated nanorod depicted in FIG. 2B).

The lipid layer 310 of the nanocomposite particle is mainly constituted by lipids optionally modified with polymers, sugars, fatty acids, esters, vitamins etc. The lipid may be a naturally-occurring lipid, a synthetic lipid, a semi-synthetic lipid, or a combination thereof. Non-limiting examples of lipid suitable for acting as the lipid layer 310 include fatty acid, lysolipid, fluorinated lipid, phosphocholine, phosphatidylcholine (e.g., dioleoylphosphatidylcholine, dimyristoylphosphatidylcholine, dipentadecanoylphosphatidylcholine, dilauroylphosphatidylcholine, dipalmitoylphosphatidylcholine (DPPC), distearoylphosphatidylcholine (DSPC), and diarachidonylphosphatidylcholine (DAPC)), phosphatidylethanolamine (e.g., dioleoylphosphatidylethanolamine, dipalmitoylphosphatidylethanolamine (DPPE), and distearoylphosphatidylethanolamine (DSPE)), phosphatidylserine, phosphatidylglycerol (e.g., distearoylphosphatidylglycerol (DSPG)), phosphatidylinositol, sphingolipid (e.g., sphingomyelin), glycolipid (e.g., ganglioside GM1 and GM2), glucolipid, sulfatide, glycosphingolipid, phosphatidic acid (e.g., dipalmitoylphosphatidic acid (DPPA), and distearoylphosphatidic acid (DSPA)), palmitic acid, stearic acid, arachidonic acid, oleic acid, lipid bearing one or more polymers (such as, chitin, hyaluronic acid, polyvinylpyrrolidone (PVP), and polyethylene glycol (PEG)), lipid bearing one or more sulfonated mono-, di-, oligo- or polysaccharides, cholesterol, cholesterol sulfate, cholesterol hemisuccinate, tocopherol hemisuccinate, lipid with one or more ether and ester-linked fatty acids, polymerized lipid, diacetyl phosphate, dicetyl phosphate, stearylamine, and cardiolipin. According to some embodiments of the present disclosure, the lipid layer 310 is constituted from DPPC, DPPA, and DSPE. In one specific example, the lipid layer 310 is constituted from DPPC, DPPA, and DSPE, in which the lipid DSPE having a PEG polymer attached thereto, and the PEG polymer has an average molecular weight of about 2,000 (termed as "DSPE-PEF 2000").

Optionally, the lipid layer 310 of the present disclosure may have one or more targeting molecule conjugated thereon, wherein the targeting molecule recognizes a specific cell marker (e.g., tumor-associated antigen, TAA) so as to improve the therapeutic effect of the present nanocomposite particle. The targeting molecules suitable to be conjugated with the present lipid layer include, but are not limited to, an antibody or the fragment thereof, aptamer, targeting peptide, and a combination thereof.

The thus-produced nanocomposite particle is useful for treating various diseases, for example, cancers. Specifically, upon being excited by a suitable wavelength (e.g., 808 nm) of light, the present nanocomposite particle is capable of converting the light into thermal energy (i.e., heat), and thereby enabling local therapeutic hyperthermia of desired tissues or cells; such phototherapy is known as photothermal therapy (PTT). In addition, in the case when the nanocomposite particle comprises a photosensitizing agent (e.g., MC540) in the mesoporous scaffold, the irradiation (e.g., 808 nm wavelength) would further induce the photosensitizing agent to produce ROS, which then causes damage or death to desired tissues or cells (a phototherapy known as photodynamic therapy (PDT)), and thus additively or synergistically enhancing the therapeutic effect of PTT.

Also disclosed herein are uses of the nanocomposite particle of the present disclosure in treating cancers in a subject. The method of treating a cancer in a subject comprises the steps of, (a) administering to the subject an effective amount of the nanocomposite particle of the present disclosure, wherein the nanocomposite particle comprises an anti-tumor agent or a photosensitizing agent in the mesoporous scaffold of the encapsulated nanorod; and (b) irradiating the subject of step (a) with a light having a wavelength of about 750-850 nm so as to produce a cytotoxic effect on the tumor.

Basically, the subject is a mammal, for example, a human, a mouse, a rat, a hamster, a guinea pig, a rabbit, a dog, a cat, a cow, a goat, a sheep, a monkey, or a horse. Preferably, the subject is a human.

In the step (a), an effective amount of the nanocomposite particle comprising an anti-tumor agent or a photosensitizing agent is administered to the subject via an appropriate route, which includes, for instance, oral, enteral, nasal, topical, transmucosal, subcutaneous, intratumoral, intradermal, intramuscular, intravenous, or intraperitoneal injection.

Then, in the step (b), the subject administered with the nanocomposite particle of the present disclosure is irradiated with a light having a wavelength of about 750-850 nm; for example, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, or 850 nm. According to some embodiments of the present disclosure, the core-shell-shell nanoparticle of the nanocomposite particle is NaYF$_4$:Yb/Er/Ho@NaYF$_4$:Yb/Nd@NaYF$_4$, and the encapsulated nanorod is an mesoporous silica-coated gold nanorod (i.e., a gold nanorod encapsulated by a mesoporous silica scaffold; AuNR@mS). In these embodiments, a light having a wavelength of about 808 nm is administered to the subject so as to simultaneously elicit the photothermal and photodynamic responses of the present nanocomposite particle.

Basically, the tumor treatable by the present nanocomposite particle and/or the present method may be any of melanoma, leukemia, tongue carcinoma, colorectal carcinoma, esophageal carcinoma, gastric carcinoma, lung cancer, multiple myeloma, bladder cancer, breast cancer, pancreatic cancer, renal cancer, hepatocellular carcinoma, ovarian cancer, prostate cancer, or head and neck squamous cell carcinoma.

The following examples are provided to elucidate certain aspects of the present invention and to aid those of skilled in the art in practicing this invention. These examples are in no way to be considered to limit the scope of the invention in any manner. Without further elaboration, it is believed that one skilled in the art can, based on the description herein, utilize the present invention to its fullest extent. All publications cited herein are hereby incorporated by reference in their entirety.

EXAMPLE

Example 1 Synthesis of Nanocomposite Particle AuNR@UCNP@NB

Nanocomposite particles AuNR@UCNP@NB exhibiting PTT and PDT effects on target cells (e.g. tumor cells) were prepared in this example. Each nanocomposite particle AuNR@UCNP@NB comprises in its structure, a nanocomposite AuNR@UCNP, and a lipid/phospholipid layer forming a nanobubble (NB) that encapsulates the nanocomposite AuNR@UCNP in its internal void, in which the nanocomposite AuNR@UCNP is formed by a mesoporous silica-coated AuNR (AuNR@mS), and a nanoparticle NaYF$_4$:Yb/Er/Ho@NaYF$_4$:Yb/Nd@NaYF$_4$ (UCNP) linked with the AuNR@mS via electrostatic interactions. The present nanocomposite particles AuNR@UCNP@NB were synthesized in accordance with the following steps.

Step 1. Synthesis of Mesoporous Silica-Coated AuNR (AuNR@mS)

AuNR was prepared via conventional seed-mediated growth with minor modification. The hexadecyltrimethylammonium bromide ($C_{19}H_{42}BrN$, CTAB; 0.2 M, 5 mL) and gold (III) chloride trihydrate ($HAuCl_4 \cdot 3H_2O$; 0.1 M, 25 μL) were prepared and served as the seed solution, which was reduced to Au seeds by adding sodium borohydride ($NaBH_4$; 0.01 M, 0.6 mL) under an ultrasonic environment with pipetting. The growth solution was prepared from the CTAB solution (0.2 M, 125 mL) with sodium salicylate (0.8 g) at 55° C. and mixed with the $AgNO_3$ (4 mM, 6 mL) and $HAuCl_4$ (1 mM, 250 mL) solutions at 30° C. for 15 minutes. Thereafter, the ascorbic acid solution (0.064 M, 1 mL) was added without disturbance. After the addition of the seed solution (0.8 mL) into the growth solution, the solution was incubated at 30° C. overnight without stirring. AuNRs were purified by centrifugation at 10,000 rpm for 30 minutes. Tetraethyl orthosilicate (TEOS, 30 μL) in the AuNR solution (10 mL) was added in an alkaline environment with constant stirring for 2 days. The solution was refluxed with HCl at 60° C. for 6 hours to form the mesoporous silica-coated AuNR (AuNR@mS). AuNR@mS was purified by centrifugation for 20 minutes at 10,000 rpm, and redispersed in deionized water.

For the purpose of producing a PDT effect, the photosensitizer merocyanine 540 (MC540) was loaded in the mesopores of the silica shell by the addition of MC540 solution (6 mM, 10 μL) in the AuNR@mS solution followed by stirring for 24 hours. The solution was purified by centrifugation at 10,000 rpm for 20 minutes, and redispersed in deionized water.

Step 2. Synthesis of Nanoparticle NaYF$_4$:Yb/Er/Ho@NaYF$_4$:Yb/Nd@NaYF$_4$ (UCNP)

UCNP was synthesized by high-temperature co-precipitation method. The core of the NaYF$_4$:Yb/Er/Ho nanocrystal was made by adding 0.64 mmol Y(CH$_3$CO$_2$)$_3$, 0.144 mmol Yb(CH$_3$CO$_2$)$_3$, 0.004 mmol Er(CH$_3$CO$_2$)$_3$, and 0.012 mmol Ho(CH$_3$CO$_2$)$_3$ with 6 mL oleic acid (OA) and 14 mL octadecene (ODE), which was heated to 120° C. to evaporate the water. Thereafter, this mixture was heated to 170° C. to allow ligand formation between the lanthanide ions (Ho, Er, and Yb) and OA. The precursor was cooled to 45° C., while the methanol solution containing 2 mmol NaOH and 3.16 mmol NH$_4$F were added and stirred for 1.5 hours. The temperature was increased to 120° C. for 10 minutes under vacuum so as to remove the methanol, and heated at 305° C. for 1.5 hours in the nitrogen environment. The NaYF$_4$:Yb/Er/Ho nanocrystal was purified by centrifugation with anhydrous ethanol and stored in cyclohexane.

The NaYF$_4$:Yb/Nd shell was synthesized by repeating the core formation process but using a different precursor concentration, including 0.51 mmol Y(CH$_3$CO$_2$)$_3$, 0.034 mmol Yb(CH$_3$CO$_2$)$_3$, and 0.136 mmol Nd(CH$_3$CO$_2$)$_3$. At the shell layer-forming steps, the NaYF$_4$:Yb/Er/Ho core nanocrystal was prepared and added with the host materials of shell into the precursor. The shell forming and precipitation steps were repeated to form NaYF$_4$:Yb/Er/Ho@NaYF$_4$:Yb/Nd.

The synthesis was repeated thrice to form the UCNP, in which the precursor contained only Y(CH$_3$CO$_2$)$_3$. The thus-prepared UCNP comprising an outer shell composed of NaYF$_4$. To obtain the water-soluble UCNP, the oil phase sample was washed with alcohol-diluted HCl to remove the OA and ODE ligands.

Step 3. Synthesis of Nanocomposite AuNR@UCNP Via Modifying AuNR@mS with UCNP

The AuNR@mS and UCNP respectively synthesized in steps 1 and 2 were employed as the starting materials for producing the nanocomposite AuNR@UCNP. Briefly, the UCNP solution (2 mg/mL) was first mixed with the protamine solution (20 mg/mL), and stirred for 24 hours at room temperature. The coated UCNP was then purified by centrifugation at 7,600 rpm for 6 minutes. Thereafter, the coated UCNP solution was conjugated with the AuNR@mS solution in a different ratio and stirred for 1 hour, which was purified by centrifugation thrice, each time at 7,600 rpm for 6 minutes.

Step 4. Synthesis of AuNR@UCNP@NB Via Encapsulating AuNR@UCNP with Lipid/Phospholipid Layer Three phospholipids, including DPPC, DPPA, and DSPE-PEG2000 were used to form the lipid/phospholipid layer for encapsulating the nanocomposite AuNR@UCNP of step 3. The phospholipids were dissolved in chloroform (4 mL) and a phospholipid film was formed after natural evaporation of the solvent. The solution containing glycerol (10%) and AuNR@UCNP was mixed with the thin film, and placed in a shaking incubator for 1 hour at 37° C. followed by sonication for 2 minutes so as to obtain the nanocomposite particle AuNR@UCNP@NB.

The thus-produced AuNR@UCNP@NB exhibits both the PTT and PDT effects on target cells (e.g. tumor cells). Specifically, after being irradiated with a light of 808 nm, the nanocomposite AuNR@UCNP would produce a PTT effect on target cells via plasmonic enhancement, and the photosensitizer MC540 loaded in the mesopores of AuNR@mS would exhibit a PDT effect on target cells via producing ROS molecules that additively or synergistically improves the PTT effect.

According to the results, nanobubbles had substantially greater echogenicity than corresponding solid objects of similar size. The encapsulation of the nanocomposite particle in a phospholipid shell to form a surrounding nanobubble caused the resulting nano-product to become an excellent ultrasound contrast agent that was readily imaged using B-mode ultrasound. Particle locations became visible upon insonation and were trackable with ultrasound, which allowed treatment (PDT or PTT) locations to be readily identified.

Example 2 Characterization of Nano-Products

The characteristics of each nano-product synthesized in Example 1, including AuNR, AuNR@mS, UCNP, AuNR@UCNP, and AuNR@UCNP@NB, were investigated in this example.

2.1 AuNR and AuNR@mS

The good dispersity of AuNR and AuNR@mS in deionized water was observed using transmission electron microscopy (TEM) with an aspect ratio of 2.7 and silica thickness of 9 nm (data not shown). The two characteristic absorption peaks of MC540 and AuNR@mS respectively absorbed the 530 nm and 650 nm fluorescence emitted from UCNP. The strong absorbance enhancement between 490 nm and 540 nm confirmed the successful loading of MC540 in AuNR@mS (data not shown). MC540 was loaded in AuNR@mS via mixing two solutions; the MC540-loaded AuNR@mS had a hydrodynamic diameter of 42 nm (data not shown). Through centrifugation, the unloaded or superficial adsorption of MC540 was washed and removed by water. The real loading amount of MC540 in mesopores was approximately 23% (data not shown).

2.2 UCNP

The core-shell-shell (three layers) structure of UCNP was synthesized by co-precipitation method, in which the third layer structure could protect the crystal damage of UCNP. The X-ray diffraction patterns indicated that the β-NaYF$_4$ hexagonal phase (JCPDS 16-0334) of UCNP was maintained after the core-shell-shell synthesis (data not shown). The hydrodynamic diameter of UCNP was approximately 27 nm in the water solution (data not shown).

In the optical spectrum, the absorbance spectrum showed small peaks around 808 nm; the data confirmed that UCNP can be triggered by an 808 nm laser (data not shown). The photoluminescence (PL) spectrum indicated that the doping of erbium and holmium ions in the luminescence center caused double energy transition with three characteristic peaks around 420 nm ($^5G_5 \rightarrow {}^5I_8$ and $^2H_{9/2} \rightarrow {}^4I_{15/2}$), 540 nm ($^5S_2 \rightarrow {}^5I_8$ and $^4S_{3/2} \rightarrow {}^4I^{15/2}$) and 660 nm ($^5F_5 \rightarrow {}^5I_8$ and $^4F_{9/2} \rightarrow {}^4I_{15/2}$) (data not shown). To improve the PTT effect of AuNR@mS, the luminescent intensity of UCNP at 660 nm was enhanced by 36% through doping Ho$^{3+}$ at the core of nanocrystal (data not shown).

2.3 AuNR@UCNP

To improve energy transfer and use in the biomedical field, the UCNP was changed to water phase via pickling and combining with AuNR@mS through electrostatic adsorption. The protamine molecule with positive polarity was chosen as the link between UCNP and AuNR@mS. The protamine molecule is a Food and Drug Administration (FDA)-approved molecule that can provide positivity to the UCNP surface with its low biotoxicity. The protamine layer of UCNP can be distinguished clearly from the TEM images with 2 nm thickness (data not shown). In the Fourier-transform infrared (FTIR) spectrum, the carbon chain of the hydrophobic ligands at 2923, 2854 cm$^1$ turned to the hydroxide of the hydrophilic ligands, while the characteristic peaks of protamine were also observed after surface modification (data not shown).

Figure 4A:
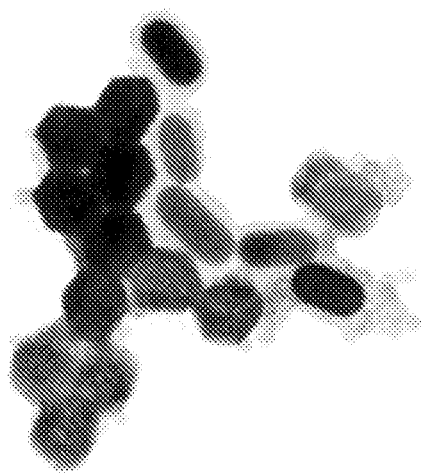
Figure 4B:
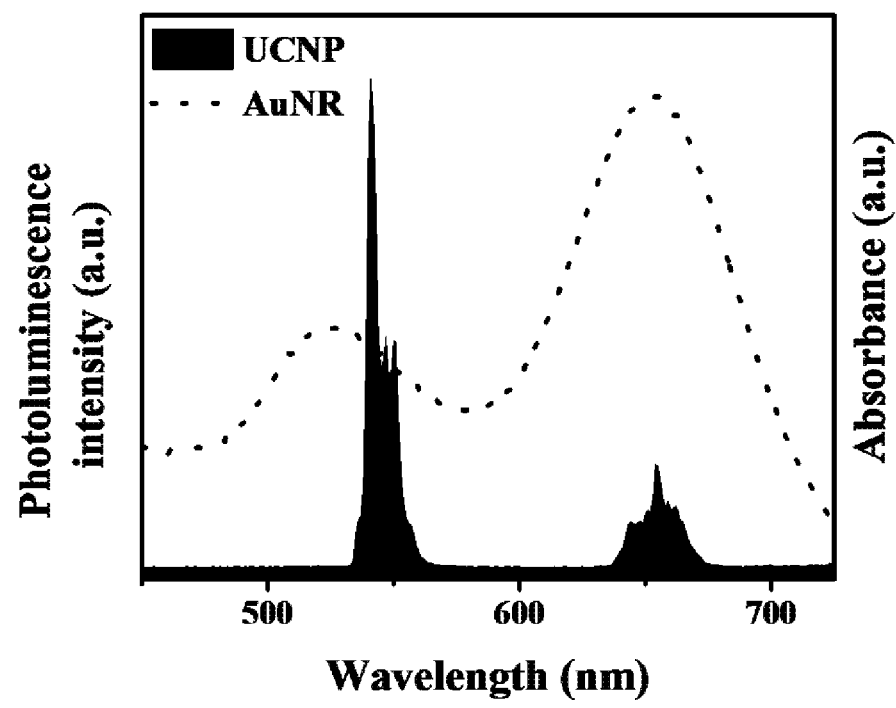
Figure 4C:
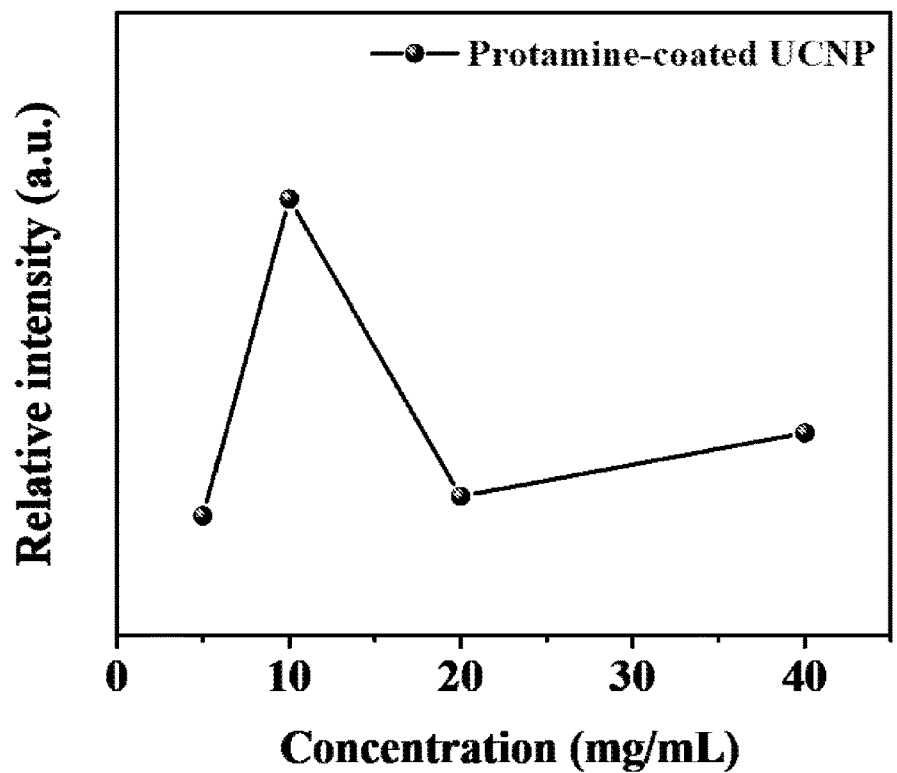

To generate the upconversion hybrid nanocomposite AuNR@UCNP, the protamine-coated UCNP was used to conjugate with AuNR@mS via electrostatic adsorption, which was detected by TEM as shown in FIG. 4A. Zeta potential measurements indicated that the surface charge of AuNR was about 28.3 mV (data not shown). After the cladding silica layer, the surface charge became approximately negative −21.2 mV (data not shown). Also, the cladding the protamine out of the UCNP made the change of surface charge from 0.22 mV to 22.5 mV (data not shown). The entirety of AuNR@UCNP possessed a positive charge of 6.13 mV, and a hydrodynamic diameter of 50 nm after the conjugation (data not shown). The 808 nm laser-triggered nanocomposite made the energy transfer from UCNP to AuNR, which was confirmed with the absorbance and PL spectrum in FIG. 4B. The amount of the protamine coated on UCNP was optimized before conjugation. The UCNP was incubated in the solution containing 5, 10, 20, or 40 mg/mL protamine. The highest emission intensity was detected in the protamine-coated UCNP produced by incubating the UCNP with 10 mg/mL protamine (FIG. 4C).

Figure 4D:
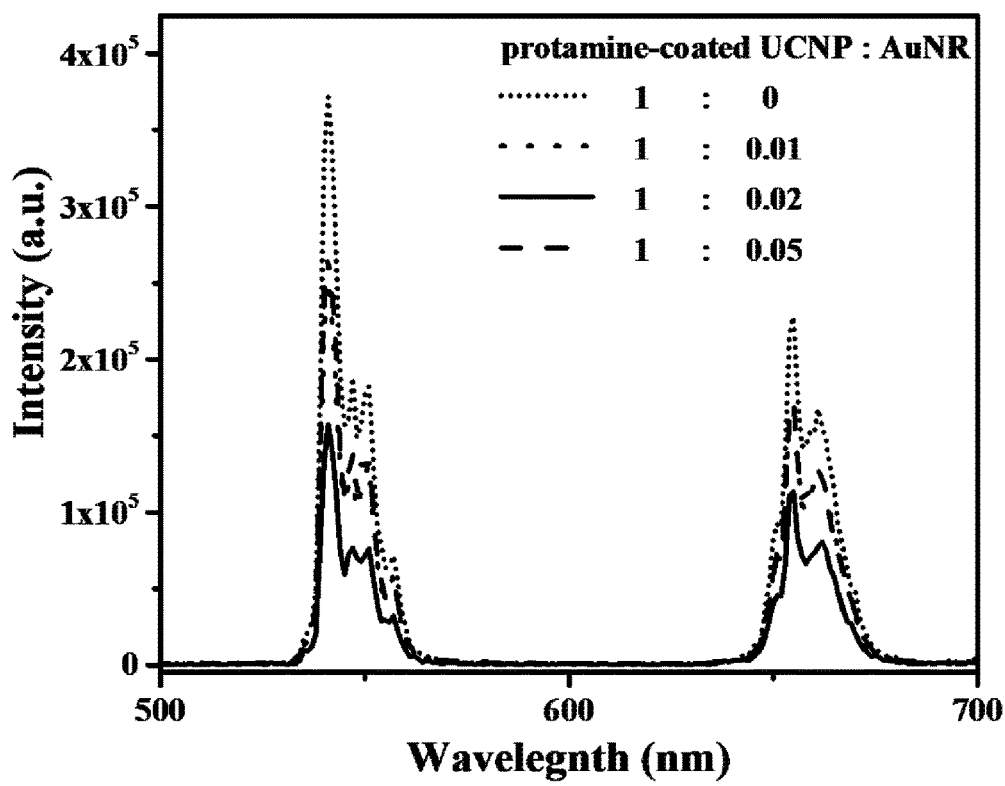

Since AuNR@mS absorbed most of the light energy emitted from UCNP, the ratio of AuNR@mS and protamine-coated UCNP was also optimized. The emission intensity of 540 nm (green light) and 660 nm (red light) declined considerably, which was attributed to the absorption by AuNR and MC540 (FIG. 4D). To identify the efficiency of energy transfer, the change of luminescent lifetime was detected after the conjugation of AuNR@mS. The luminescent lifetime of 654 nm was changed from 0.65 ms to 0.61 ms under the 808 nm laser (data not shown).

2.4 AuNR@UCNP@NB

The lipid/phospholipid layer was synthesized as the nanocarrier to transport the nanocomposite AuNR@UCNP. The staining method of dropping tungstophosphoric acid on the lipid/phospholipid layer was used to observe the morphology of lipid/phospholipid layer in TEM images that had a size of 100-300 nm (data not shown). To enhance the conductivity of lipid/phospholipid layer, platinum (Pt) was sputtered on the surface of lipid/phospholipid layer to perform an analysis of SEM test. In the SEM image, the lipid/phospholipid layer exhibited good dispersity and morphology with uniform spherical shape but broke in the vacuum environment after sputtering (data not shown). The lipid/phospholipid layer stored in the deionized water at 4° C. possessed a hydrodynamic diameter of 255 nm (data not shown).

Figure 5A:
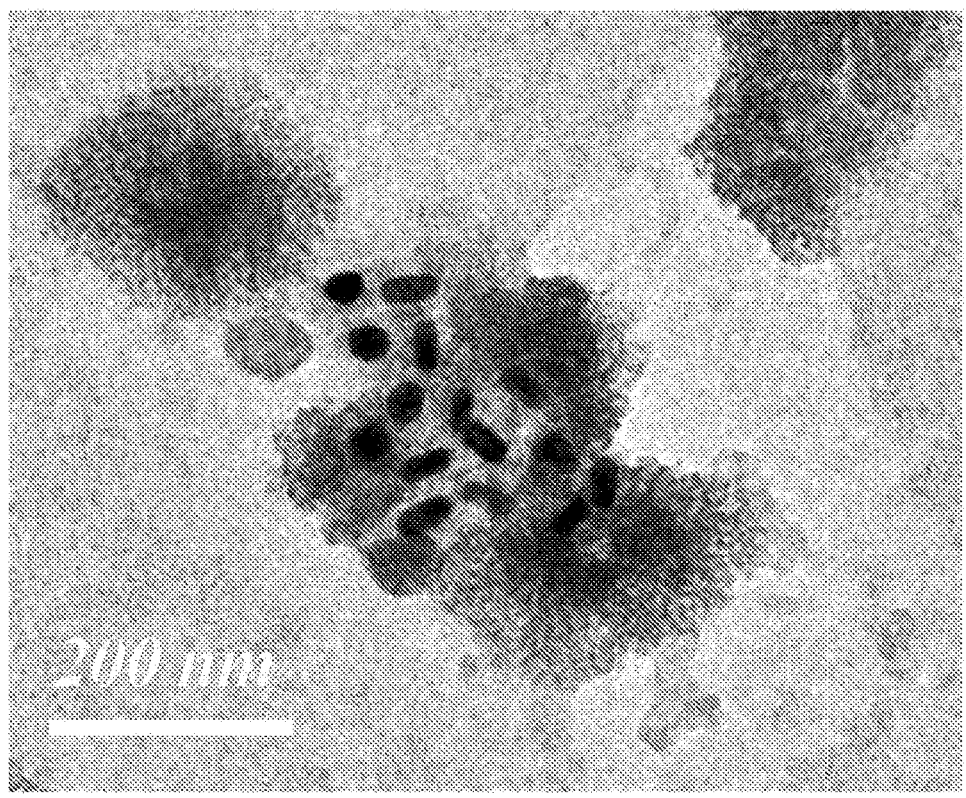
FIG. 5A-5F depict the data according to Example 2.4 of the present disclosure, in which FIGS. 5A-5B respectively illustrate the TEM and scanning electron microscope (SEM) images of AuNR@UCNP@NB.
Figure 5B:
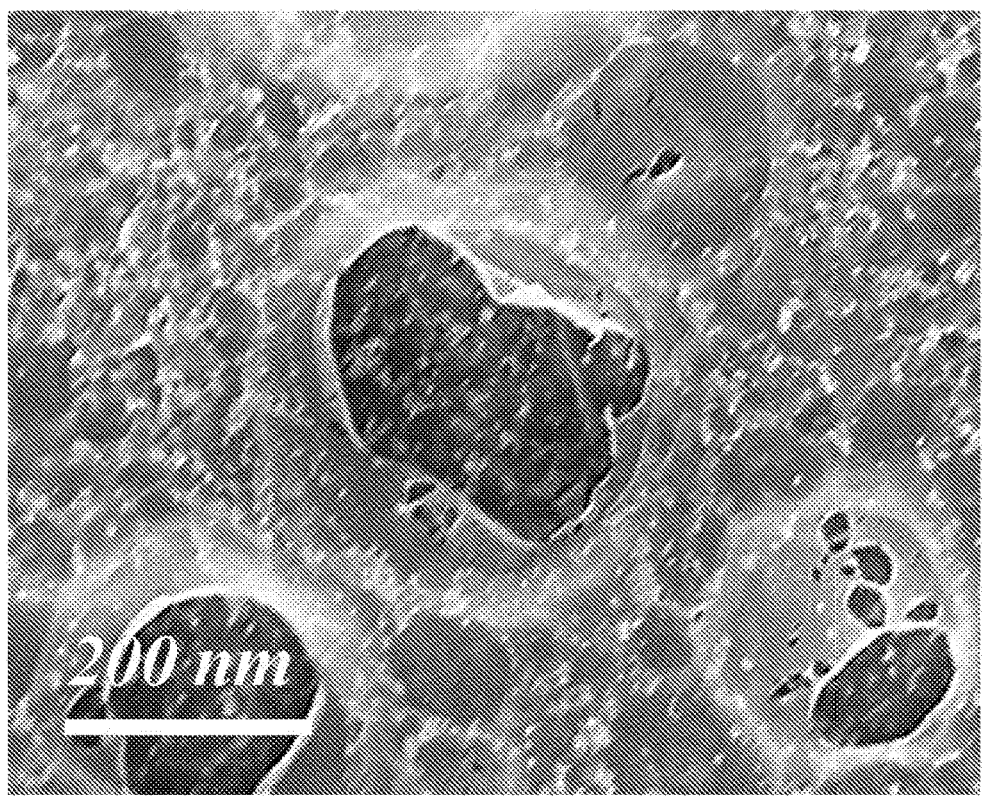
Figure 5C:
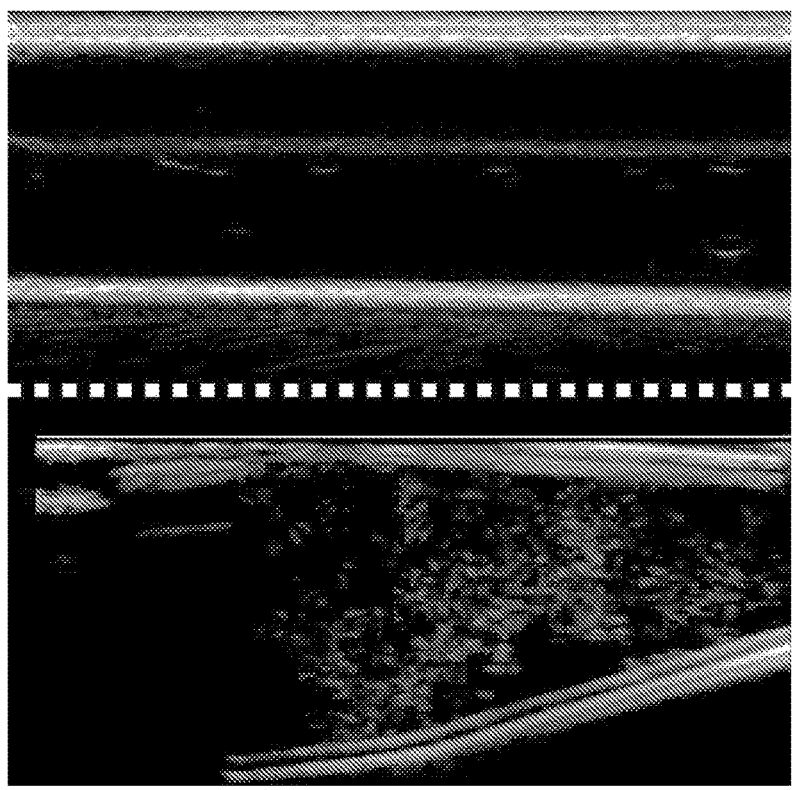
Figure 5D:
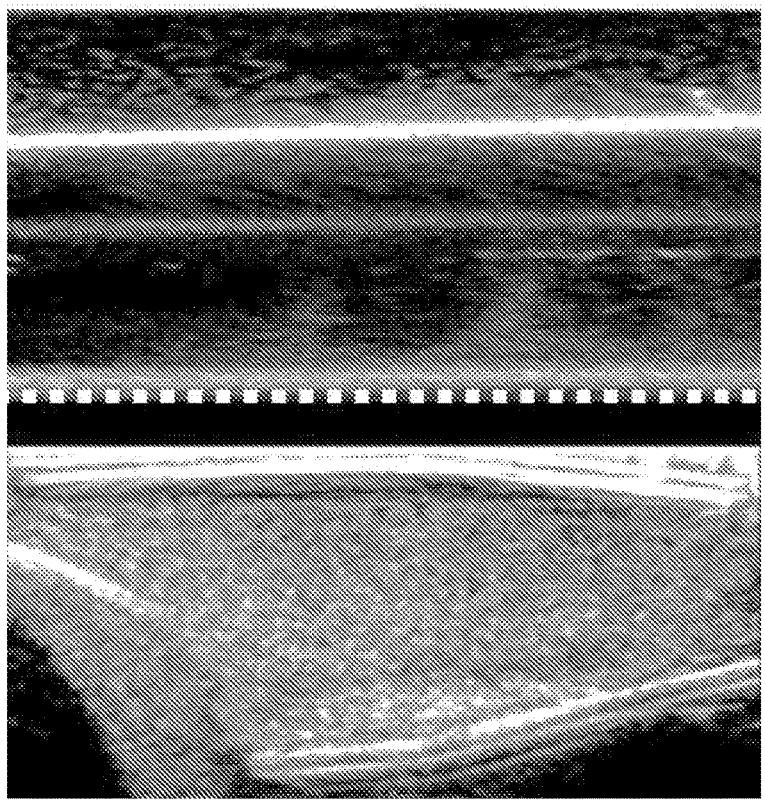
Figure 5E:
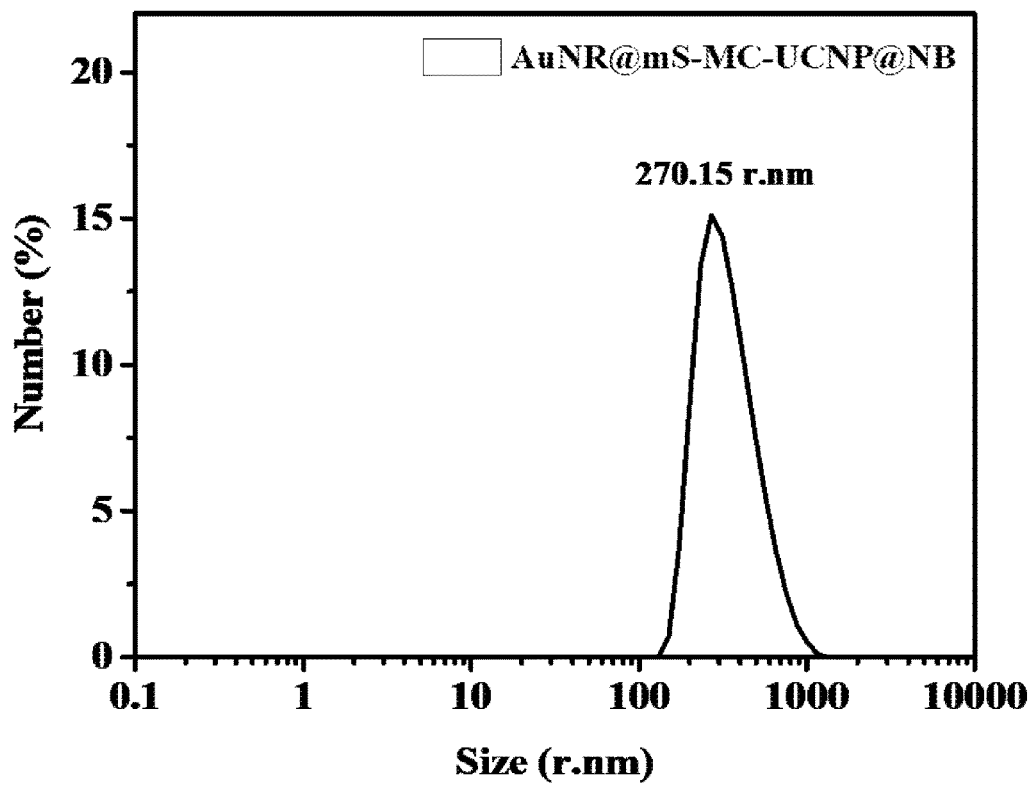
Figure 5F:
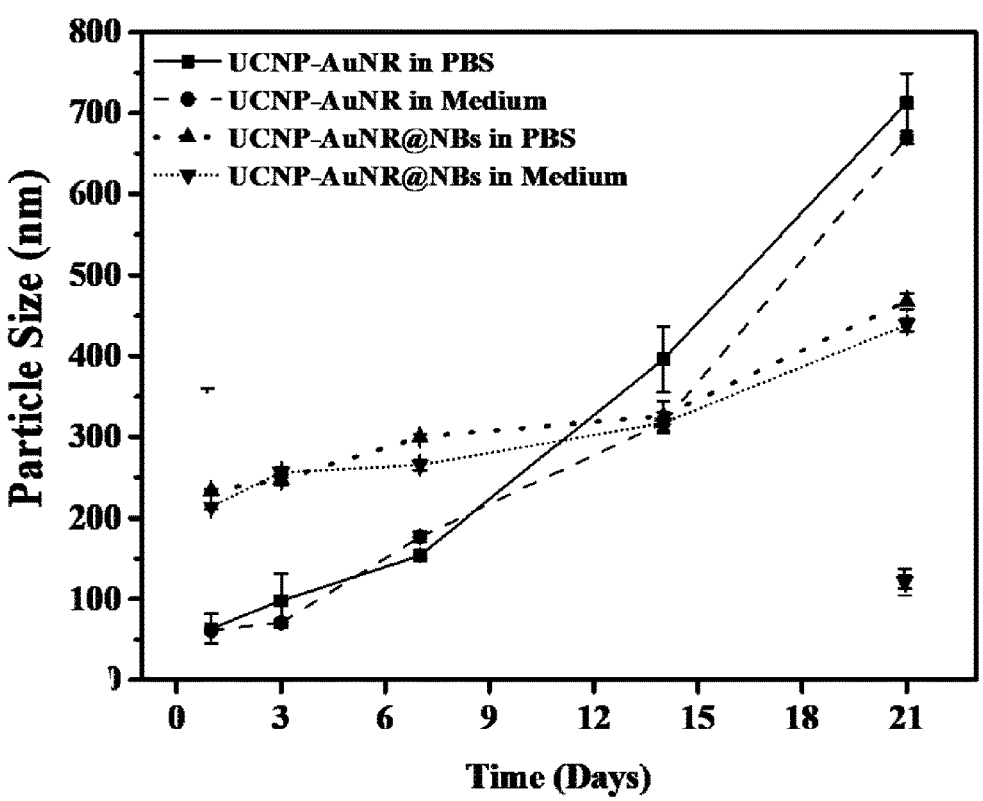

The upconversion hybrid nanocomposite AuNR@UCNP was encapsulated by the lipid/phospholipid layer. As mentioned in Example 1, three types of phospholipids, namely, DPPC, DSPE-PEG2000, and DPPA, were mixed uniformly to synthesize the micelle precursor, and before the homogeneous process, the nanocomposite AuNR@UCNP was added. The nanocomposite particle with upconversion hybrid nanocomposite AuNR@UCNP and lipid/phospholipid layer was formed under the octafluoropropane ($C_3F_8$) and nitrogen ($N_2$) environment so as to obtain the nanocomposite particle AuNR@UCNP@NB. The image of the nanocomposite AuNR@UCNP embedded by broken lipid/phospholipid layer was depicted in FIG. 5A, in which the lipid/phospholipid layer of the broken lipid/phospholipid layer was marked with a dashed curve. To evaluate the morphology of lipid/phospholipid layer, the Pt sputtering method was used as previously described. The image of the Pt-coated AuNR@UCNP@NB, which enhanced the conductivity, was depicted in FIG. 5B. As a contrast agent, the lipid/phospholipid layer also exhibited good distribution in deionized water. The data of FIGS. 5C and 5D respectively indicated that no signal was detected in the deionized water, while the addition of lipid/phospholipid layer increased the echogenicity of the solution and accordingly enhanced the ultrasonic image signal. The hydrodynamic diameter examined by dynamic light scattering (DLS) confirmed that the present nanocomposite particle AuNR@UCNP@NB was maintained in the nanoscale size that had an average diameter of 270 nm (FIG. 5E). Moreover, the stability in the different media was examined over three weeks. Without the lipid/phospholipid layer embedded, the particle size of the AuNR@UCNP substantially increased every day, while the nanocomposite particle AuNR@UCNP@NB exhibited excellent stability after three weeks of storage, which maintained the size at 200-400 nm (FIG. 5F).

Example 3 In Vitro Analysis of AuNR@UCNP@NB

Figure 6:
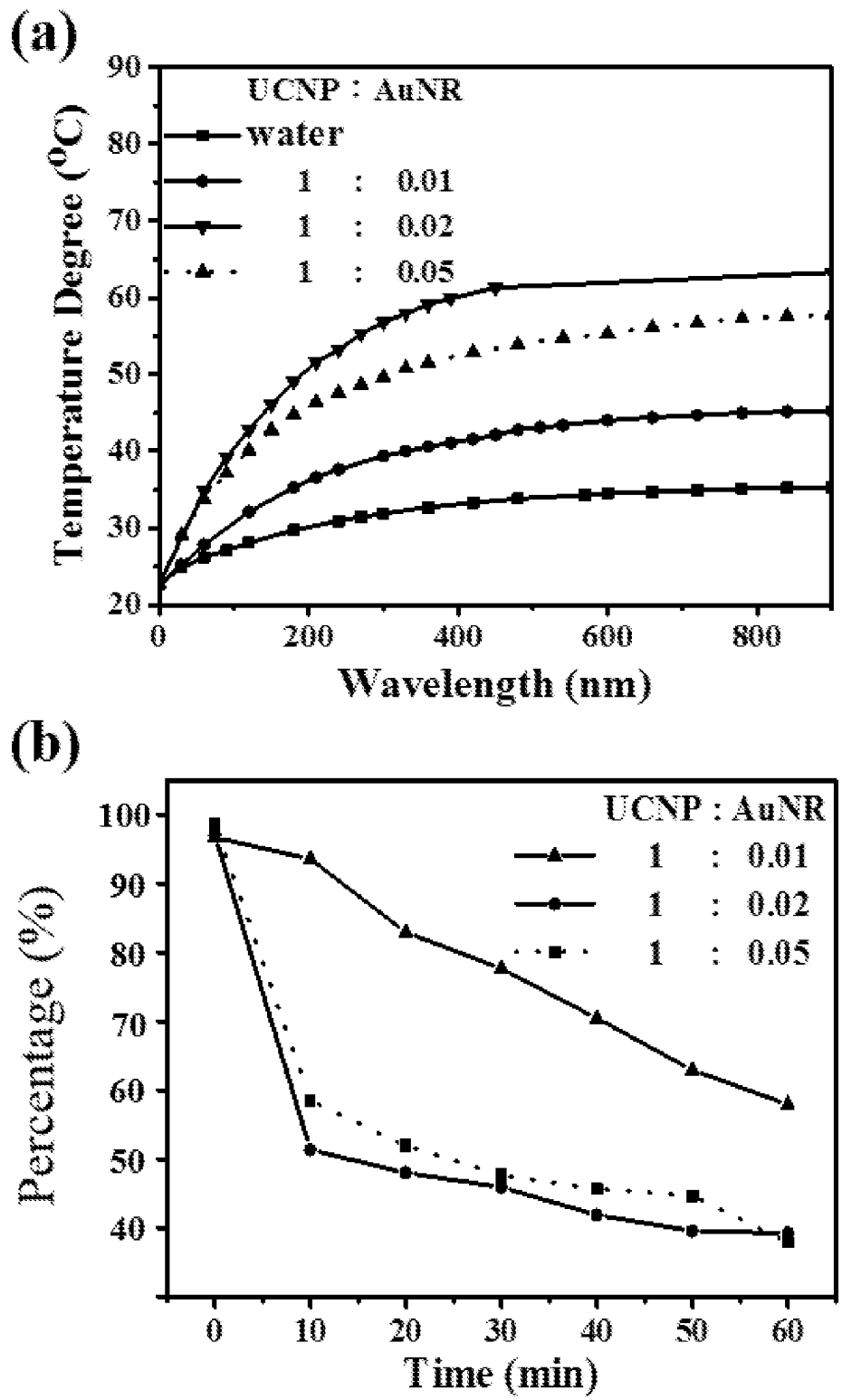
FIG. 6 depicts the data according to Example 3 of the present disclosure, in which Panels (a) and (b) respectively illustrate the data of the thermal change and the 9,10-dimethylanthrancene (ABDA) change of specified AuNR@UCNP.

After the basic characterization of the materials, the bio-activity and bio-distribution of the nanocomposite particle AuNR@UCNP@NB were determined under the 808 nm NIR laser. The results were respectively depicted in FIGS. 6 and 7.

First, the nanocomposite particle formed by different ratios of AuNR@mS and protamine-coated UCNP were detected by device for evaluating the PTT effect. To avoid loss of temperature to the environment, the tin foil was covered around the quartz cuvette with constant stirring. One mg of protamine-coated UCNP was incubated with 0, 0.01, 0.02, or 0.05 mg of AuNR@mS, and the reaction temperatures were detected by the probe of the heater so as to measure the temperature change (Panel (a) of FIG. 6). The temperature was measured every 20 seconds for 15 minutes. The improved PTT effect was observed in the nanocomposite particle formed by 0.02 mg of AuNR@mS and 1 mg of protamine-coated UCNP, in which after irradiating with 808 nm laser, the temperature of the aqueous solution approached 62° C. with increasing temperature of 41° C. (Panel (a) of FIG. 6).

Then, the PDT effect was evaluated by measuring of the level of ROS produced by the photosensitizer MC540. To detect the ROS concentration in the solution, ABDA was used as the ROS marker to determine the efficiency of PDT. When the NIR laser triggered MC540, the ROS species were generated and reacted with ABDA. The PL spectrum of ABDA was determined with a 10-minute interval for 1 hour. The absorbance of ABDA at 380 nm in the solution containing AuNR@UCNP (UCNP:AuNR=1:0.02) rapidly decreased by about 61% in the first 10 minutes; the data indicated that high level of ROS were generated in the solution (Panel (b) of FIG. 6). The considerable PTT and PDT effects were observed with the experiment of the materials.

Figure 7A:
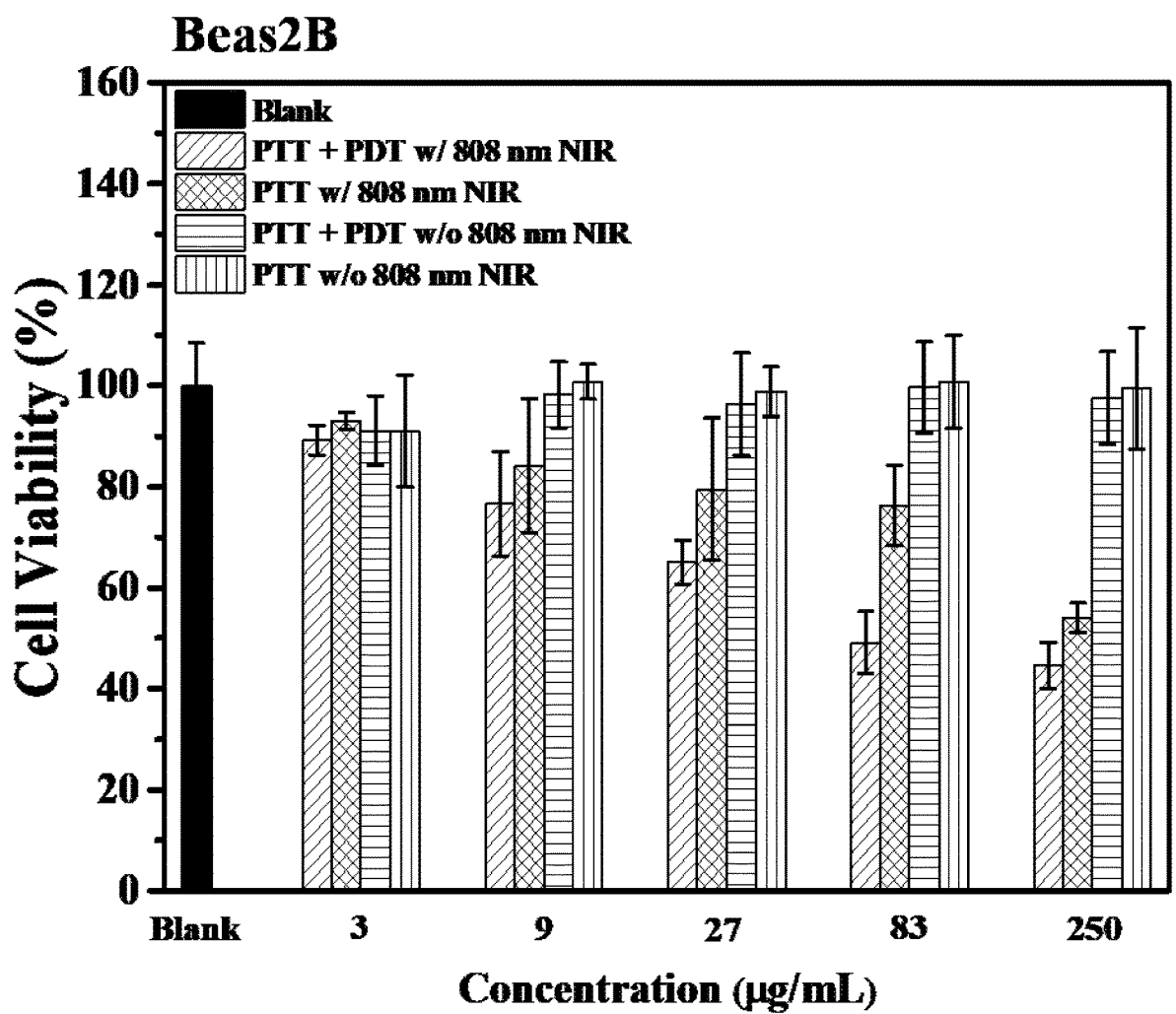
FIGS. 7A-7C depict the data according to Example 3 of the present disclosure, in which FIG. 7A and FIG. 7B respectively illustrates the viability of Beas2B and A549 cells treated with AuNR@UCNP or AuNR@UCNP@NB with or without 808 nm laser irradiation.
Figure 7B:
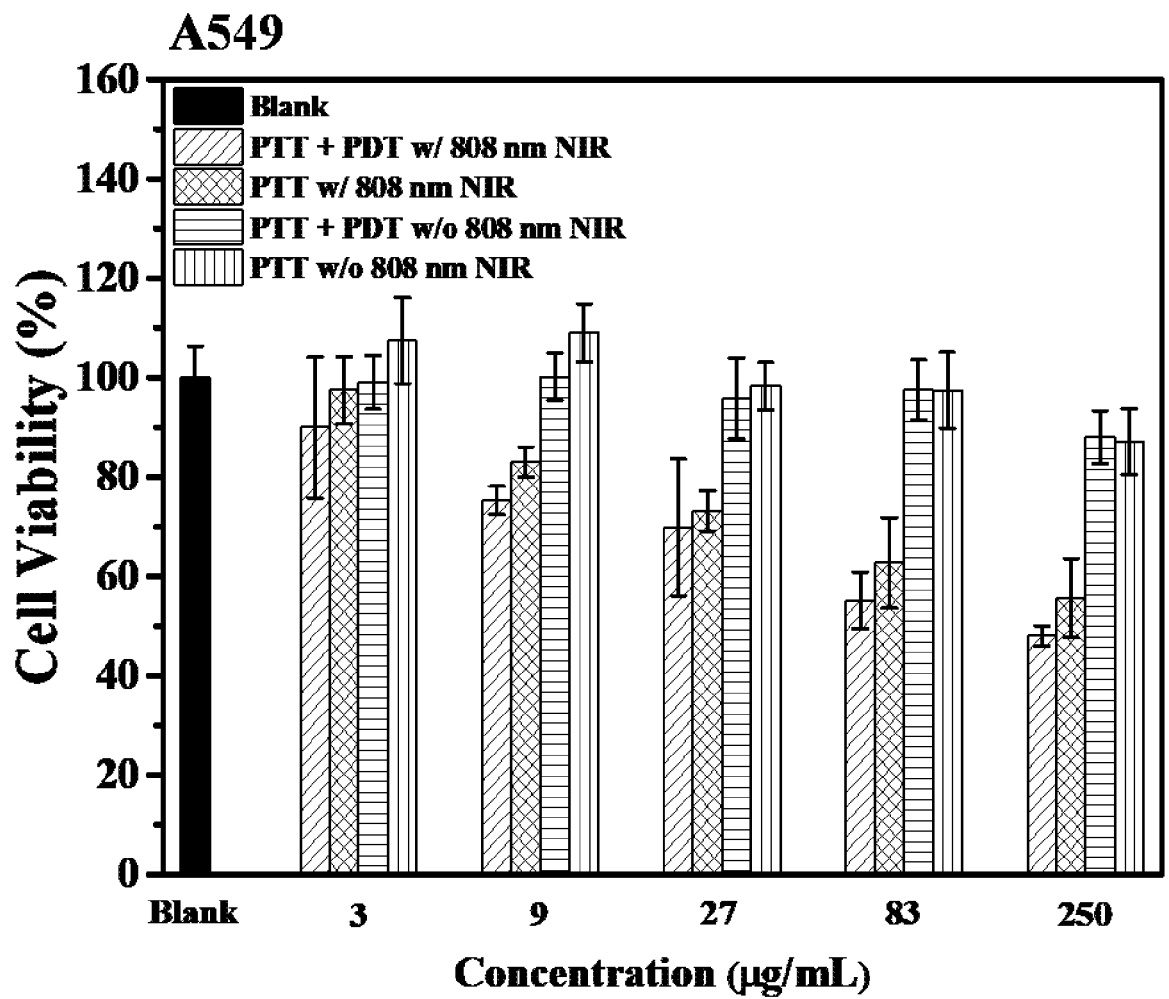
Figure 7C:
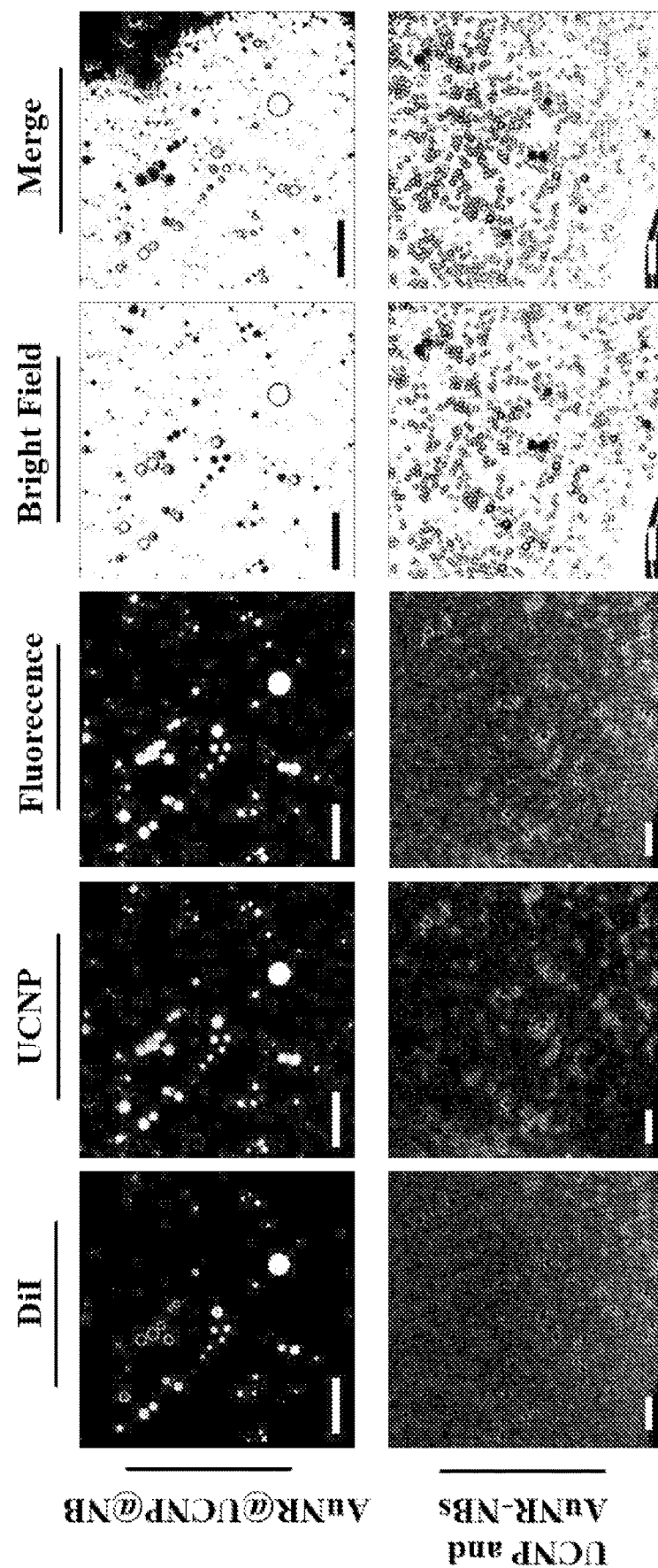

To confirm that the materials also had a good phototherapeutic effect on the organism with low cytotoxicity, an in vitro test was performed, and the results were illustrated in FIGS. 7A-7C. The Beas2B cell (normal lung cell line) and A549 cell (lung cancer cell line) were treated with 3, 9, 27, 81, or 250 μg/mL of AuNR@UCNP or AuNR@UCNP@NB followed by irradiation with 808 nm (1.5 W/cm$^2$) for 6 minutes per well that prevented the medium from overheating. The data of FIGS. 7A-7B indicated that the toxicity of AuNR@UCNP or AuNR@UCNP@NB was only observed under the 808 nm laser, in which the treatment of AuNR@UCNP or AuNR@UCNP@NB with 808 nm laser obviously decreased the cell viability in a dose-dependent manner (FIGS. 7A and 7B). Without the NIR irradiation, neither the AuNR@UCNP nor AuNR@UCNP@NB exhibited toxicity to the cells, and the cell viability was above 80%.

The distribution of AuNR@UCNP or AuNR@UCNP@NB in the cell was also determined by LSCM. Whether AuNR@UCNP may be successfully encapsulated by lipid/phospholipid layer was determined by the additional step, in which the addition of AuNR@UCNP before and after the lipid/phospholipid layer formation respectively served as the control and experimental groups. The morphology of the lipid/phospholipid layer, which was stained with DiI and emitted red light under LSCM, was detectable in both the experimental group (i.e., AuNR@UCNP@NB) and control group (i.e., UCNP and AuNR-NB) as depicted in FIG. 7C. Compared to the control group, in which AuNR@UCNP with green emission was separated out of lipid/phospholipid layer, AuNR@UCNP of the experimental group gathered together to form a circle (FIG. 7C). When the fluorescence images were merged, the green emission of UCNP and the red emission of lipid/phospholipid layer were overlapped in the AuNR@UCNP@NB, and thus producing an orange emission (FIG. 7C). With the bright field images, the lipid/phospholipid layer can be detected directly (FIG. 7C).

The results demonstrated that the nanocomposite particle AuNR@UCNP@NB could be successfully produced by the present method; after administering to the target cell and being excited by suitable stimulation (i.e., a wavelength of 808 nm), such the nanocomposite particle is useful in controlling cell growth via the PTT and PDT effects.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A nanocomposite particle comprising,
a core-shell-shell nanoparticle comprising,
   a phosphor core, which is made of a first phosphor material doped with an emitter ion;
   an inner shell layer encapsulating the phosphor core, wherein the inner shell layer is made of a second phosphor material doped with an absorber ion;
   an outer shell layer encapsulating the inner shell layer, wherein the outer shell layer is made of a third phosphor material; and
   a cationic polymer coupled to the outer shell layer;
an encapsulated nanorod comprising,
   a nanorod; and
   a mesoporous scaffold encapsulating the nanorod, in which the mesoporous scaffold comprises a therapeutic agent therein;
   wherein the encapsulated nanorod is linked with the core-shell-shell nanoparticle via an electrostatic interaction between the cationic polymer and the mesoporous scaffold; and
a lipid layer encapsulating the core-shell-shell nanoparticle and the encapsulated nanorod.

2. The nanocomposite particle of claim 1, wherein the first, second and third phosphor materials are independently selected from the group consisting of sodium yttrium fluoride, lanthanum fluoride, lanthanum oxysulfide, yttrium oxysulfide, yttrium fluoride, yttrium gallate, yttrium aluminum garnet, gadolinium fluoride, barium yttrium fluoride, and gadolinium oxysulfide.

3. The nanocomposite particle of claim 2, wherein each of the first, second and third phosphor material is sodium yttrium fluoride.

4. The nanocomposite particle of claim 1, wherein the emitter ion and absorber ion are independently selected from the group consisting of erbium (Er), ytterbium (Yb), thulium (Tm), holmium (Ho), neodymium (Nd), praseodymium (Pr), and a combination thereof.

5. The nanocomposite particle of claim 4, wherein the first phosphor material is doped with Yb, Er, and Ho, and the second phosphor material is doped with Yb and Nd.

6. The nanocomposite particle of claim 1, wherein the cationic polymer is protamine, histone, spermine, spermidinepolylysine, polyhistidine, polyarginine, polyornithine, polybrene, or a combination thereof.

7. The nanocomposite particle of claim 6, wherein the cationic polymer is the protamine.

8. The nanocomposite particle of claim 1, wherein the nanorod is a gold nanorod, a silver nanorod, a platinum nanorod, a copper nanorod, a palladium nanorod, or a zinc oxide (ZnO) nanorod.

9. The nanocomposite particle of claim 8, wherein the nanorod is the gold nanorod.

10. The nanocomposite particle of claim 1, wherein the mesoporous scaffold is a mesoporous silica scaffold.

11. The nanocomposite particle of claim 1, wherein the therapeutic agent is an anti-tumor agent, an anti-inflammatory agent, an anti-microbial agent, an anti-oxidant agent, a growth factor, or a photosensitizing agent.

12. The nanocomposite particle of claim 11, wherein the therapeutic agent is the anti-tumor agent or the photosensitizing agent.

13. The nanocomposite particle of claim 1, wherein the lipid layer is formed by dipalmitoylphosphatidylcholine (DPPC), dipalmitoylphosphatidic acid, and distearoylphosphatidylethanolamine (DSPE).

14. A method of treating a tumor in a subject, comprising,
(a) administering to the subject an effective amount of the nanocomposite particle of claim 12; and
(b) irradiating the subject of step (a) with a light having a wavelength of about 750-850 nm so as to produce a cytotoxic effect on the tumor.

15. The method of claim 14, wherein each of the first, second and third phosphor materials of the nanocomposite particle is sodium yttrium fluoride.

16. The method of claim 14, wherein
the first phosphor material of the nanocomposite particle is made of sodium yttrium fluoride doped with Yb, Er and Ho; and
the second phosphor material of the nanocomposite particle is made of sodium yttrium fluoride doped with Yb and Nd.

17. The method of claim 14, wherein the cationic polymer of the nanocomposite particle is protamine.

18. The method of claim 14, wherein the nanorod of the nanocomposite particle is a gold nanorod, and the mesoporous scaffold is a mesoporous silica scaffold.

19. The method of claim 14, wherein the light has a wavelength of about 808 nm.

\* \* \* \* \*